(12) United States Patent
Huang et al.

(10) Patent No.: US 12,091,364 B2
(45) Date of Patent: Sep. 17, 2024

(54) MAX PHASE MATERIAL, PREPARATION METHOD THEREFOR AND APPLICATION THEREOF

(71) Applicant: NINGBO INSTITUTE OF MATERIALS TECHNOLOGY & ENGINEERING, CHINESE ACADEMY OF SCIENCES, Ningbo (CN)

(72) Inventors: Qing Huang, Ningbo (CN); Mian Li, Ningbo (CN); Youbing Li, Ningbo (CN); Xiaobing Zhou, Ningbo (CN); Kan Luo, Ningbo (CN); Shiyu Du, Ningbo (CN); Zhengren Huang, Ningbo (CN)

(73) Assignee: NINGBO INSTITUTE OF MATERIALS TECHNOLOGY & ENGINEERING, CHINESE ACADEMY OF SCIENCE, Ningbo (CN)

( * ) Notice: Subject to any disclaimer, the term of this patent is extended or adjusted under 35 U.S.C. 154(b) by 1015 days.

(21) Appl. No.: 16/977,097

(22) PCT Filed: Nov. 28, 2018

(86) PCT No.: PCT/CN2018/117811
§ 371 (c)(1),
(2) Date: Sep. 1, 2020

(87) PCT Pub. No.: WO2020/010783
PCT Pub. Date: Jan. 16, 2020

(65) Prior Publication Data
US 2020/0407281 A1 Dec. 31, 2020

(30) Foreign Application Priority Data

Jul. 10, 2018  (CN) .......................... 201810751303.5
Jul. 10, 2018  (CN) .......................... 201810751944.0
Aug. 15, 2018  (CN) .......................... 201810930369.0

(51) Int. Cl.
*C04B 35/56* (2006.01)
*C04B 35/65* (2006.01)

(52) U.S. Cl.
CPC .............. *C04B 35/56* (2013.01); *C04B 35/65* (2013.01); *C04B 2235/3272* (2013.01); *C04B 2235/3281* (2013.01); *C04B 2235/3293* (2013.01)

(58) Field of Classification Search
None
See application file for complete search history.

(56) References Cited

U.S. PATENT DOCUMENTS

| 5,286,441 A | 2/1994 | Shibata |
| 2018/0044182 A1* | 2/2018 | Barsoum ............. C01B 21/0632 |

FOREIGN PATENT DOCUMENTS

| CN | 1495290 A | 5/2004 |
| CN | 102633505 A | 8/2012 |

(Continued)

OTHER PUBLICATIONS

Nechiche, M., et al. "Synthesis and characterization of a new (Ti1-ϵ, Cuϵ) 3 (Al, Cu) C2 MAX phase solid solution." Journal of the European Ceramic Society 37.2 (2017): 459-466. (Year: 2017).*

(Continued)

*Primary Examiner* — Humera N. Sheikh
*Assistant Examiner* — Elizabeth D Ivey
(74) *Attorney, Agent, or Firm* — Bayramoglu Law Offices LLC

(57) ABSTRACT

The disclosure provides an MAX phase material, a preparation method therefor, and application thereof. The molecular formula of the MAX phase material is represented as $M_{n+1}(A_z A'_{1-z})_h X_n$, wherein M is selected from group IIIB, (Continued)

IVB, VB or VIB elements, A is selected from element Zn, Cu, Ni, Co, Fe or Mn, A' is selected from group IB, IIB, VIII, IVA, VA or VIA elements, X is selected from elements C and/or N, n is 1, 2, 3 or 4, $0<z\leq 1$, a unit cell of the MAX phase material is formed by alternately stacking $M_{n+1}X_n$ units and $(A_zA_zA'_{1-z})_h$ layers of atoms, and h is the number of layers of the $(A_zA_zA'_{1-z})$ layers of atoms located between the $M_{n+1}X_n$ unit layers, and h is 1, 2 or 3.

17 Claims, 15 Drawing Sheets

(56) References Cited

FOREIGN PATENT DOCUMENTS

| CN | 104628395 A | 5/2015 |
|----|----|----|
| CN | 104928742 A | 9/2015 |
| CN | 105295303 A | 2/2016 |
| CN | 105418072 A | 3/2016 |
| CN | 106083117 A | 11/2016 |
| CN | 107742561 A | 2/2018 |
| CN | 108821291 A | 11/2018 |
| WO | 2004112641 A2 | 12/2004 |
| WO | 2015173188 A1 | 11/2015 |

OTHER PUBLICATIONS

Magnetic properties and structural characterization of layered (Cr0.5Mn0.5)2AuC synthesized by thermally induced substitutional reaction in (Cr0.5Mn0.5)2GaC; Chung-Chuan Lai et al; APL Materials 6, 026104 (published on-line Feb. 13, 2018); doi: 10.1063/1.5006304 (Year: 2018).*

Synthesis and characterization of a nevv (T1J_0 )Cui::)J(Al.Cu)C2 I.VIAX phase solid solution (From IDS); M. Nechiche et al; Journal of the European Ceramic Society; Available online Oct. 1, 2016 (Year: 2016).*

Mustapha Nechiche et al., Synthesis and Characterization of a New (Ti1-ϵ, Cuϵ)3(Al, Cu)C2 MAX Phase Solid Solution, Journal of the European Ceramic Society, 2016, pp. 1-8.

C. Tholander et al., Strong piezoelectric response in stable TiZnN2, ZrZnN2, and HfZnN2 found by ab initio high-throughput approach, Journal of Applied Physics, 2016, pp. 1-6, 120, 225102.

Mustapha Nechiche et al., Evidence for Symmetry Reduction in Ti3(Al1—Cu)C2 MAX Phase Solid Solutions, Inorganic Chemistry, 2017, pp. 14388-14395, vol. 56.

Olivier Dezellus et al., Experimental evidence of copper insertion in a crystallographic structure of Ti3SiC2 MAX phase, Scripta Materialia, 2015, pp. 17-20, vol. 104.

M. Nechiche, et al., Synthesis and characterization of a new (Ti1-[epsilon],Cu[epsilon])3(Al,Cu)C2 MAX phase solid solution, Journal of the European Ceramic Society, 2017, pp. 459-466, 37.

T. Galvin, et al., Molten salt synthesis of MAX phases in the Ti—Al—C system, Journal of the European Ceramic Society, 2018, pp. 4585-4539, 38.

C Tholander, et al., Strong piezoelectric response in stable TiZnN2, ZrZnN2, and HfZnN2 found by ab initio high-throughput approach, Journal of Applied Physics, 2016, pp. 225102-1-6, 120.

H. H. Stadelmaier, et al., Ternary Carbides of the Transition Metals Nickel, Cobalt, Iron, Manganese with Zinc and Tin, Acta Metallurgica, 1959, pp. 415-419, vol. 7.

Mian Li, et al., Element Replacement Approach by Reaction with Lewis Acidic Molten Salts to Synthesize Nanolaminated MAX Phases and MXenes, 2019.

* cited by examiner

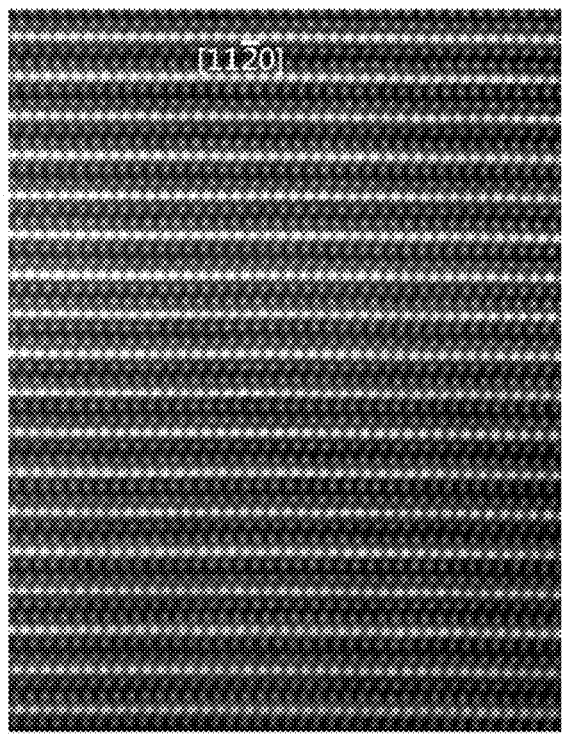 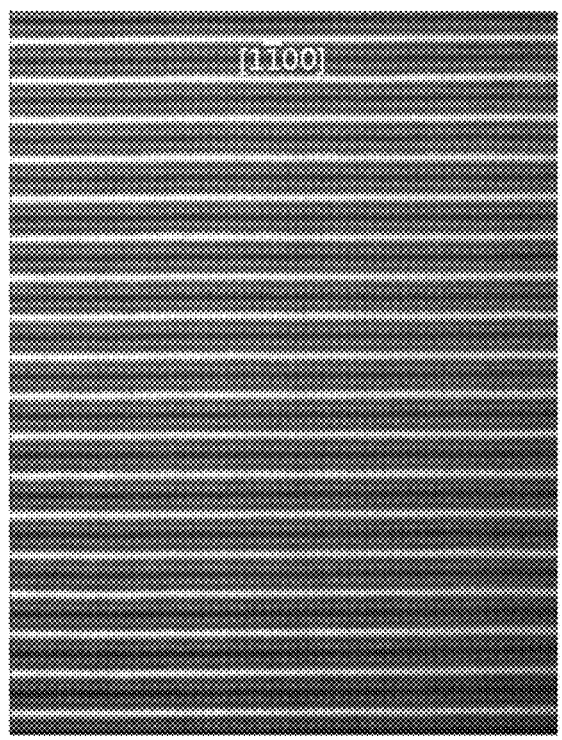
FIG. 26a     FIG. 26b
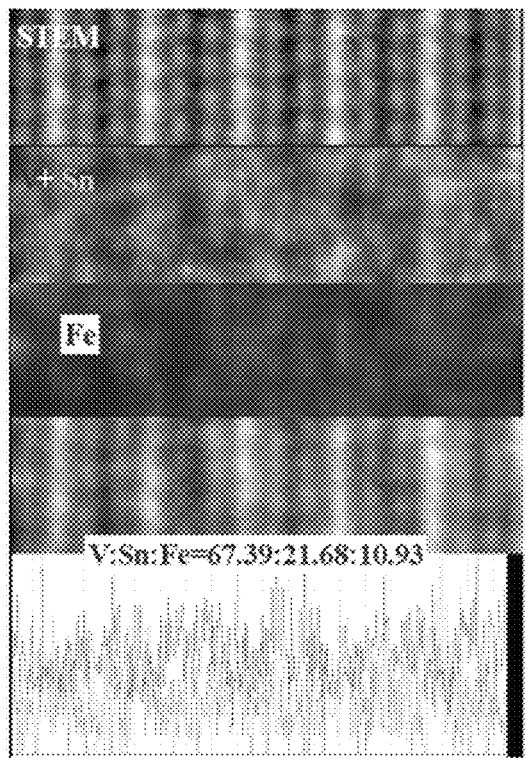
FIG. 27

MAX PHASE MATERIAL, PREPARATION METHOD THEREFOR AND APPLICATION THEREOF

CROSS REFERENCE TO THE RELATED APPLICATIONS

This application is the national stage entry of International Application No. PCT/CN2018/117811, filed on Nov. 28, 2018, which is based upon and claims priority to Chinese Patent Application No. 201810751303.5, filed on Jul. 10, 2018, Chinese Application No. 201810751944.0, filed on Jul. 10, 2018, and Chinese Application No. 201810930369.0, filed on Aug. 15, 2018, the entire contents of which are incorporated herein by reference.

TECHNICAL FIELD

The disclosure relates to a composite inorganic material, particularly relates to a novel MAX phase material, more particularly to a novel ternary layered MAX phase material with Zn, Cu, Ni, Co, Fe, Mn and the like at the position A, a preparation method therefor and application thereof, belonging to the technical field of materials.

BACKGROUND

An MAX phase is a class of ternary compounds having microcosmic layered structures with a molecular formula being $M_{n+1}AX_n$, wherein M is early transition metal elements in group IIIB, IVB, VB and IVB, A is mainly group IIIA and IVA elements, X is carbon or nitrogen, and n=1~3. The MAX phase material has a hexagonal system structure and a space group of P63/mmc, and its unit cell is formed by alternately stacking $M_{n+1}X_n$ units and A atom surfaces, n=1, 2 or 3, which are generally called 211, 312 and 413 phases for short. The MAX phase has the characteristics of high strength, high toughness, high conductivity, low irradiation activity, good damage tolerance and thermal shock resistance, high temperature resistance, oxidation resistance, easy processing and the like, and can be applied in the fields of aerospace thermal structure materials, high-temperature electrode materials, frictional wear materials, nuclear energy structure materials, energy storage materials and the like.

At present, about 70 MAX phase materials have been researched and synthesized. The unique properties of the MAX phase materials in the aspects of physics, chemistry, electricity, mechanism and the like have potential application in the fields of high-temperature electrodes, frictional wear and nuclear energy structural materials. During the previous period, the applications of the MAX phase materials are mainly focused on their structural properties. However, in recent years, scientists synthesize a series of new MAX phase materials (referred to as isomorphism MAX phases) through solid solution, substitution or other means, which has extremely important significance for expanding types of MAX phase materials, understanding crystal structures and regulating physical and chemical properties.

Expansion of MAX phase material family is a direction that material scientists struggle to research, which is of important significance for understanding the crystal structure of the ternary layered material and regulating the physical properties. However, at present, the A-position elements of the existing MAX material are limited to elements contained by main group IIIA and IVA all the time, especially, the A-position atoms of the most MAX materials are all Al elements. Change in A-position elements can cause changes in MAX phase bonding strength and electronic structure, so as to further deeply affect its physical and chemical properties and then give it rich functional features. Theoretical prediction indicates that the structure of the electronic energy band of the MAX phase material with Zn, Cu and the like at the position A is completely different from that of the traditional MAX phase material with main group elements, the MAX phase material with Zn, Cu and the like at the position A has huge application potentiality in the fields of energy storage, catalysis, magnetic shielding and absorption. However, introduction of magnetic elements at the position A, such as Ni, Co and Fe, can allow the MAX phase material to have regulatory magnetic property, thereby endowing huge potential application in the fields of data storage, records, refrigeration, electron spin and the like. Hence, expansion of existence range of the A-position elements of the MAX phase materials and exploration of novel MAX phase materials have important theoretical and practical meanings. Recently, Lin Xueping University of Sweden and Physics and Chemistry Institute of Lanzhou University find that the new MAX phase materials can be synthesized through element replacement utilizing high chemical activity of A-position elements while maintaining the twin structure $M_{n+1}X_n$ layer. Therefore, some Max materials which can not be synthesized by the traditional solid phase methods can be realized by A-position element replacement, which is of great significance to expand the types of MAX phase materials and regulate the physical and chemical properties.

The existing MAX phase material preparation process is a solid-phase sintering method, that is, M, A, X and other element powders are mixed, and then heated for high-temperature reaction. However, the types of the MAX phase materials prepared by this method are limited, wherein A is only limited to the above-mentioned group IIIA and IVA elements such as Al and Si. Although some researchers try to replace A-position elements as Zn, Cu, Ni, Co, Fe, Mn and other elements and prepare corresponding MAX phase materials by the solid-phase sintering method, however, in the process of solid-phase sintering, A-position elements such as Zn, Cu, Ni, Co, Fe and Mn are prone to reacting with M-position elements such as Ti, V and Cr to generate an alloy phase, and the thermodynamic stability of the alloy phase is far higher than that of the target MAX phase, namely, the alloy phase is preferably generated, so that the MAX phase material with Zn at the position A cannot be formed. So as far, there are few reports on the MAX phase materials with Zn, Cu, Ni, Co and Fe at the position A.

SUMMARY

The main objective of the present application is to provide an MAX phase material in order to overcome the defects of the prior art.

The objective of the present application is to provide a ternary layered MAX phase material with Zn, Cu, Co, Ni, Fe and Mn at the position A, a preparation method therefor and application thereof.

In order to achieve the foregoing objectives of the disclosure, the technical solution adopted by the present application comprises:

The embodiment of the present application provides an MAX phase material, wherein the molecular formula of the MAX phase material is represented as $M_{n+1}(A_zA'_{1-z})_nX_n$, M being selected from group IIIB, IVB, IIB, IVA or VIA elements, A being selected from elements Zn, Cu, Ni, Co, Fe or Mn, A' being selected from group IIIA, IVA, VA or VIA elements, X being selected from elements C and/or N, n being 1, 2, 3 or 4, 0<z≤1, h being the number of layers of the ($A_zA'_{1-z}$) layers of atoms located between the $M_{n+1}X_n$ unit layers, and h being 1, 2 or 3.

The embodiment of the present application further provides a preparation method for the MAX phase material, comprising:

mixing a precursor MAX phase material, an A and/or A-containing material and an inorganic salt in a molar ratio of 1:(1.5~3):(3~6), carrying out high-temperature reaction on the obtained mixture at 400° C.~1000° C. in an inert atmosphere, subsequently carrying out post-treatment to obtain an MAX phase material with A element at the position A; the molecular formula of the precursor MAX phase material is represented as $M_{m+1}A'X_m$, wherein M is selected from early transition metal elements in group IIIB, IVB, VB or VIB, A' is selected from group IIIA or IVA elements, X comprises C and/or N, m=1, 2 or 3, and A is any one or a combination of more than two of Zn, Cu, Ni, Co, Fe or Mn element.

The embodiment of the present application further provides use of the novel MAX phase material in the fields of preparation of aerospace thermal structure materials, nuclear energy structure materials, high-temperature electrode materials, frictional wear materials, energy storage materials and the like.

The embodiment of the present application further provides use of the MAX phase material with Zn and Cu at the position A in the fields of energy storage, catalysis, magnetic shielding and absorption and the like.

The embodiment of the present application further provides use of the MAX phase material with Zn, Co, Fe and Mn at the position A in the fields of data storage, record, magnetic refrigeration and electron spin and the like.

Compared with the prior art, the present application at least has the following advantages:

(1) The preparation method of the MAX phase material provided by the present application realizes the preparation of the MAX phase material with Zn, Cu, Ni, Co, Fe and Mn elements at the position A for the first time, and is simple to operate and low in consumption and has universality;

(2) the A-position elements of the novel MAX phase material provided by the present application comprise Zn and Cu elements, and the electronic structure of the novel MAX phase material has been greatly changed compared with that of the existing MAX phase material, such the changes can cause changes in the physical and chemical properties of the MAX phase material, and have a profound impact on its application in the fields of aerospace thermal structural materials, nuclear energy structural materials, energy storage, catalysis, electromagnetic shielding and absorption and the like;

(3) the A-position elements of the MAX phase material provided by the present application contain elements such as Mn, Fe, Co and Ni, and the electronic structure of the MAX phase material has been greatly changed compared with that of the existing MAX phase materials, which can lead to a fact that the MAX phase material is changed in physical and chemical properties, has the characteristics of both metals and ceramics, has the characteristics of high strength, high thermal conductivity, oxidation resistance, high temperature resistance, high damage tolerance and machinability, and possesses potential applications in the fields of nuclear energy structural materials, catalysis, microwave absorption, electromagnetic shielding, spin electron and magnetic refrigeration.

BRIEF DESCRIPTION OF THE DRAWINGS

FIG. 26a and FIG. 26b are respectively HRTEM images of ternary layered MAX phase material V$_2$(Sn$_z$Fe$_{1-z}$)C with a magnetic element at the position A observed along different crystal zone axes in example 13 of the present application.

FIG. 27 is an EDS diagram of ternary layered MAX phase material V$_2$(Sn$_z$Fe$_{1-z}$)C with a magnetic element at the position A under a high-resolution transmission electron microscope in example 13 of the present application.

DETAILED DESCRIPTION OF THE EMBODIMENTS

Figure 1:
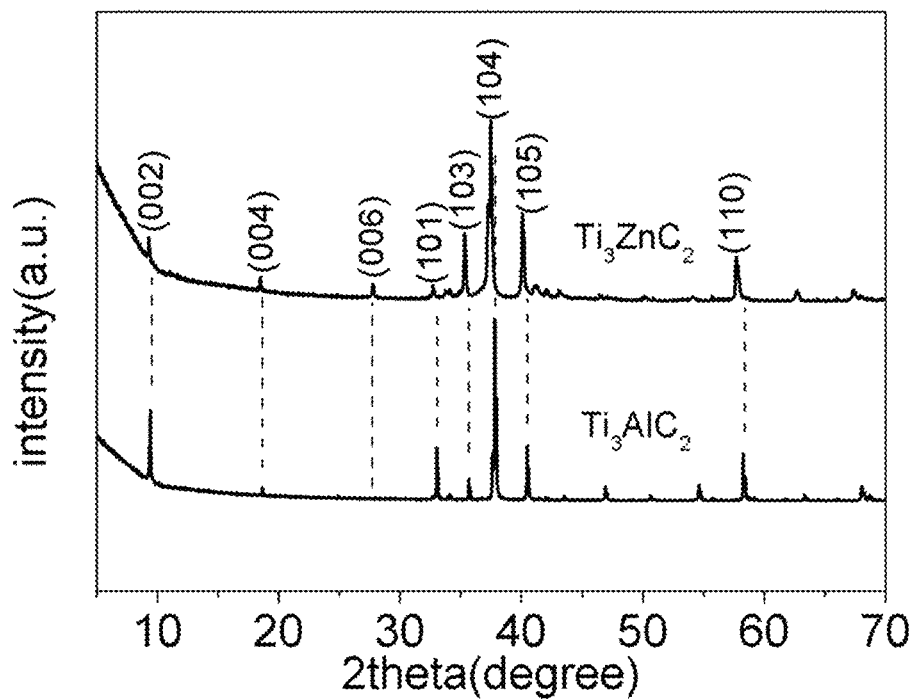
FIG. 1 is an XRD spectrogram of MAX phase material $Ti_3ZnC_2$ in example 1 of the present application and the traditional $Ti_3AlC_2$.

As described above, in view of the defects in the prior art, the inventor of the present application proposes the technical solution of the present application through long-term researches and lots of practices. The technical solution, its implementation process and principle and the like will be described in detail below.

The embodiment of the present application provides an MAX phase material, wherein the molecular formula of the MAX phase material is represented as $M_{n+1}(A_zA'_{1-z})_hX_n$, M being selected from group IIIB, IVB, IIB, IVA, or VIA elements, A' being selected from group IB, IIB, VIII, IVA, VA or VIA elements, A being selected from Zn, Cu, Mn, Fe, Co or Ni element, X being selected from elements C and/or N, n being 1, 2, 3 or 4, $0 < z \le 1$, h being the number of layers of the $(A_zA'_{1-z})$ layers of atoms located between the $M_{n+1}X_n$ unit layers, and h being 1, 2 or 3.

Further, the MAX phase material has a hexagonal system structure and a space group of P63/mmc, and a unit cell is formed by alternately stacking $M_{n+1}X_n$ units and $(A_zA'_{1-z})_h$ layers of atoms.

Where, as one aspect of the present application, the involved MAX phase material is a novel MAX phase material, its molecular formula is represented as $M_{n+1}(A_zA'_{1-z})_hX_n$, wherein A is Zn, Cu, Mu, Fe, Co or Ni element, h is the number of layers of the A layers of atoms located between the $M_{n+1}X_n$ unit layers, and the unit cell of the MAX phase material is formed by alternately stacking $M_{n+1}X_n$ units and $A_h$ layers of atoms.

Where, as one aspect of the present application, the involved MAX phase material is a novel MAX phase material, its molecular formula is represented as $M_{n+1}(A_zA'_{1-z})_hX_n$, wherein M is selected from any one or a combination of more than two of group IIIB, IVB, VB and VIB elements, A is Zn, Cu, Mn, Fe, Co or Ni element, X is any one or a combination of more than two of elements C and/or N, n is 1, 2, 3 or 4, h is the number of layers of the A layers of atoms located between the $M_{n+1}X_n$ unit layers, and the unit cell of the MAX phase material is formed by alternately stacking $M_{n+1}X_n$ units and $A_h$ layers of atoms.

Further, h is 1, 2 or 3.

Further, the M can preferably comprise any one or a combination of more than two of Sc, Ti, V, Cr, Zr, Nb, Mo, Hf and Ta.

Further, the X can preferably be $C_xN_y$, wherein x+y=1.

Further, the MAX phase material has a hexagonal crystal system structure and a space group of P63/mmc, the unit cell is formed by alternately stacking $M_{n+1}X_n$ units and $A_h$ layers of atoms.

Further, the morphology of the MAX phase material comprises any one or a combination of more than two of powders, bulks or films, but is not limited thereto.

Another aspect of the present application provides a preparation method for a novel MAX phase material, comprising:

mixing a precursor MAX phase material, an A and/or A-containing material and an inorganic salt in a molar ratio of 1:(1.5~3):(3~6), carrying out high-temperature reaction on the obtained mixture at 400° C.~1000° C. in an inert atmosphere, subsequently carrying out post-treatment to obtain an MAX phase material with A element at the position A; the molecular formula of the precursor MAX phase material is represented as $M_{m+1}A'X_m$, wherein M is selected from early transition metal elements in group IIIB, IVB, VB or VIB, A' is selected from group IIIA or IVA elements, X comprises C and/or N, m=1, 2 or 3, and A is any one or a combination of more than two of Zn, Cu, Ni, Co, Fe and Mn.

Further, the precursor MAX phase material comprises any one or a combination of more than two of Ti$_3$AlC$_2$, Ti$_3$SiC$_2$, Ti$_2$AlC, Ti$_2$AlN, Ti$_4$AlN$_3$, Ti$_2$GaC, V$_2$AlC, V$_2$GaC, Cr$_2$GaN, Cr$_2$AlC, Sc$_2$AlC, Zr$_2$AlC, Zr$_2$SnC, Nb$_2$AlC, Nb$_4$AlC$_3$, Mo$_2$AlC, Mo$_2$GaN, Hf$_2$AlC, Hf$_2$AlN, Ta$_3$AlC$_2$ and Ta$_4$AlC$_3$, but is not limited thereto.

Further, the A-containing material comprises any one or a combination of more than two of ZnO, ZnCl$_2$, ZnBr$_2$, ZnSO$_4$, CuO, CuCl$_2$, CuBr$_2$, CuSO$_4$, FeO, FeCl$_2$, FeBr$_2$, FeSO$_4$, NiO, NiCl$_2$, NiBr$_2$, NiSO$_4$, CoO, CoCl$_2$, CoBr$_2$, CoSO$_4$, MnO, MnCl$_2$, MnBr$_2$ and MnSO$_4$, but is not limited thereto.

Further, the inorganic salt comprises any one or a combination of more than two of NaF, NaK, NaCl, KCl, NaBr and KBr, but is not limited thereto.

Further, the precursor MAX phase material is any one or a combination of powders, bulks and films.

Further, the A and/or A-containing material is powder, and the particle size is 500 nm~50 μm.

Further, the inorganic salt is powder, and the particle size is 500 nm~1 mm.

In some embodiments, the posttreatment comprises: after the high-temperature reaction is ended, the obtained reactant is washed with deionized water, and then dried at 60~100° C. to obtain the novel MAX phase material.

Another aspect of the embodiment of the present application also provides use of the novel MAX phase material in the fields of preparation of aerospace thermal structure materials, nuclear energy structure materials, high-temperature electrode materials, frictional wear materials, energy storage materials or the like.

Where, examples of MAX phase materials with Zn and Cu elements at the position A are seen in example 1-example 11.

Example 1: in this example, the novel MAX phase material is $Ti_3ZnC_2$, the precursor MAX phase is $Ti_3AlC_2$, the Zn-containing material is Zn powder, the inorganic salt is NaCl, and these raw materials are all commercially available. The preparation method of $Ti_3ZnC_2$ is as follows:

(1) 5.84 g of NaCl, 6 g of $Ti_3AlC_2$ having a particle size of 10 μm and 3 g of Zn powder having 300 meshes were weighed, and the above materials were ground and mixed to obtain a mixed product.

(2) The mixture was placed in a corumdum crucible to react in a high-temperature tubular furnace. Reaction conditions were as follows: 800° C., 30 min, and argon protection. After the temperature of the tubular furnace was reduced to room temperature, a reaction product in the crucible was taken.

(3) The reaction product was washed with deionized water: the reaction product was put in a flask, deionized water was added, the above materials were stirred and ultrasonically washed for 30 min and then subjected to standing for 1 h, and supernatant was discarded. After being washed three times, the reaction product was put into a 80° C. oven and then taken out after 24 h, so as to obtain a solid product.

FIG. 1 shows comparison between the XRD spectrograms of the above prepared solid product $Ti_3ZnC_2$ and the traditional MAX phase material $Ti_3AlC_2$. Through comparison, it can be seen that peak patterns of the XRD spectrograms of the obtained solid product $Ti_3ZnC_2$ and the traditional MAX phase material $Ti_3AlC_2$ are similar in a whole, and the XRD spectrograms of the obtained solid product $Ti_3ZnC_2$ and the traditional MAX phase material $Ti_3AlC_2$ have obvious diffraction peaks orientated along the (00l) face such as (002), (004) and (006), indicating that their crystals can grow preferably along the (00l) face in the process of crystal growth and then exhibit a layered structure in a microstructure. Through the position of (002) face diffraction peak, it can be determined that the c value of the $Ti_3ZnC_2$ lattice constant is 1.87 nm which is close to the c value 1.857 nm of the $Ti_3ZnC_2$ lattice constant. The difference between their XRD spectrograms is that: 1) the intensities of (002), (004), (006), (101) and (103) diffraction peaks and the like are different, such the phenomenon is because the A-position atoms of $Ti_3ZnC_2$ and $Ti_3AlC_2$ are different, and the diffraction capabilities of their lattices on X rays are different; 2) the positions of (104), (105), (110) and other diffraction peaks are different, such the phenomenon is because the A-position atoms of $Ti_3ZnC_2$ and $Ti_3AlC_2$ are different, and their lattice parameters are different. XRD data sufficiently shows the $Ti_3ZnC_2$ material prepared in this example has a crystal structure similar to that of $Ti_3AlC_2$, and is a ternary layered MAX phase material having a P63/mmc space group structure.

Figure 2:
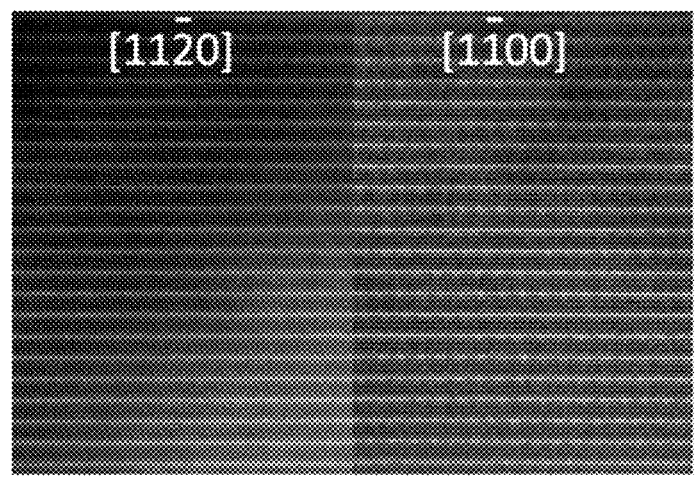
FIG. 2 is an HRTEM image of MAX phase material $Ti_3ZnC_2$ in example 1 of the present application along different crystal zone axes.

FIG. 2 shows the HRTEM morphology of $Ti_3ZnC_2$ observed along different crystal zone axes. The layered crystal structure of $Ti_3ZnC_2$ can be obviously seen through the figure, a layer with high brightness in the figure is a Zn atom layer whose atom number is large, and a layer with low brightness is a $Ti_3C_2$ layer.

Figure 3A:
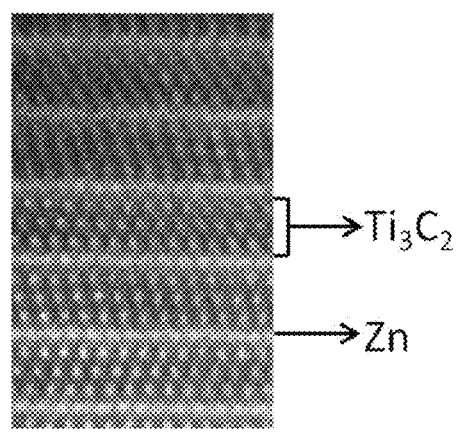
FIG. 3a is an energy spectrum analysis diagram of MAX phase material $Ti_3ZnC_2$ in example 1 of the present application under a high-resolution transmission electron microscope.
Figure 3B:
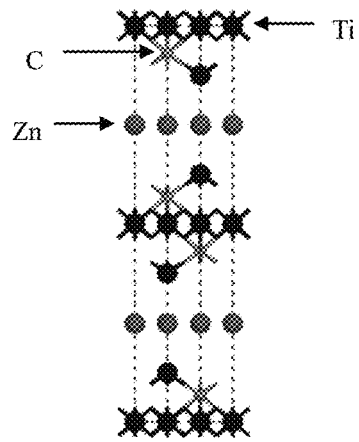
FIG. 3b is a structural diagram of a unit cell of MAX phase material $Ti_3ZnC_2$ in example 1 of the present application.
Figure 4:
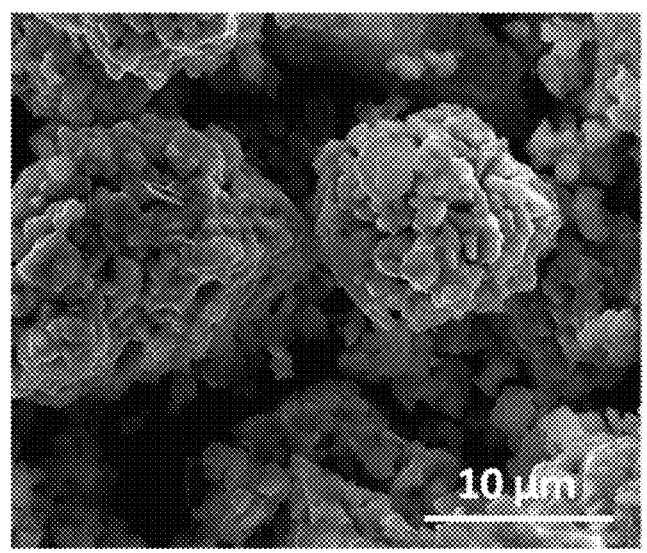
FIG. 4 is an SEM image of MAX phase material $Ti_3ZnC_2$ in example 1 of the present application.

FIG. 3a shows microstructure analysis of $Ti_3ZnC_2$ under the HRTEM. Through the figure, it can be clearly seen that the lattice of $Ti_3ZnC_2$ is formed by alternately stacking Zn atom layers and $Ti_3C_2$ layers. FIG. 3b is a diagram of a unit cell structure of $Ti_3ZnC_2$.

Example 2: in this example, the novel MAX phase material is $Ti_2ZnC$, the precursor MAX phase is $Ti_2GaC$, the Zn-containing material is $ZnSO_4$, the inorganic salt is KCl, and these raw materials are all commercially available. The preparation method of $Ti_2ZnC$ is as follows:

(1) 7.45 g of KCl, 4 g of $Ti_2GaC$ having a particle size of 10 μm and 5.4 g of $ZnSO_4$ were weighed, and the above materials were ground and mixed to obtain a mixed product.

(2) The mixture was placed in a corumdum crucible to react in a high-temperature tubular furnace. Reaction conditions were as follows: 700° C., 30 min, and argon protection. After the temperature of the tubular furnace was reduced to room temperature, a reaction product in the crucible was taken.

(3) The reaction product was washed with deionized water: the reaction product was put in a flask, deionized water was added, the above materials were stirred and ultrasonically washed for 30 min and then subjected to standing for 1 h, and supernatant was discarded. After being washed three times, the reaction product was put into a 80° C. oven and taken out after 24 h, so as to obtain a solid product.

Figure 5:
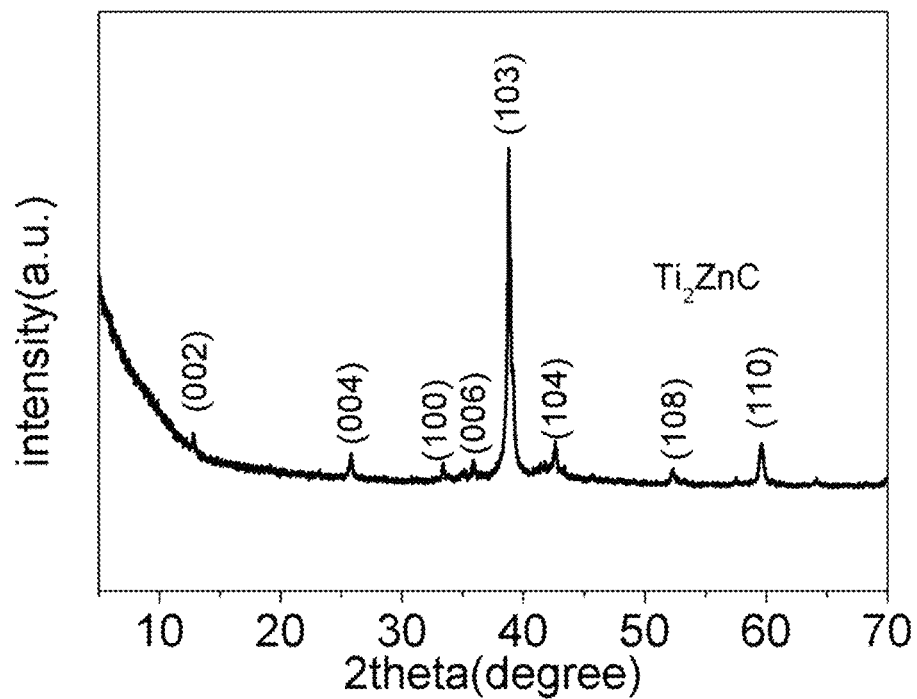
FIG. 5 is an XRD spectrogram of MAX phase material $Ti_3ZnC$ in example 2 of the present application.

FIG. 5 is the XRD spectrogram of the above prepared solid product $Ti_2ZnC$. The XRD spectrogram of $Ti_2ZnC$ has obvious (002), (004) and (006) diffraction peaks, indicating $Ti_2ZnC$ has a good orientation degree along the (00l) face, wherein, the (002) diffraction peak is located near 13°, and the c value of the corresponding lattice constant is about 1.362 nm which is close to that of 211 type MAX phase such as $Ti_2AlC$.

Figure 6:
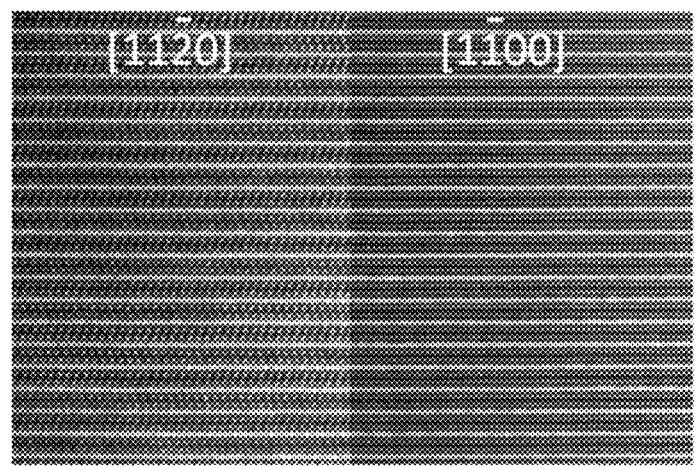
FIG. 6 is an HRTEM image of MAX phase material $Ti_3ZnC$ in example 2 of the present application along different crystal zone axes.

FIG. 6 shows the HRTEM morphology of $Ti_2ZnC$ observed along different crystal zone axes. The layered crystal structure of $Ti_2ZnC$ can be obviously seen through the figure, a layer with high brightness in the figure is a Zn atom layer whose atom number is large, and a layer with low brightness is a $Ti_2C$ layer.

Figure 7:
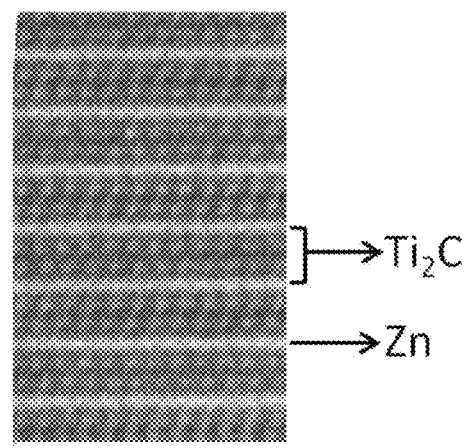
FIG. 7 is an energy spectrum analysis diagram of MAX phase material $Ti_3ZnC$ in example 2 of the present application under a high-resolution transmission electron microscope.

FIG. 7 shows microstructure analysis of $Ti_2ZnC$ under the HRTEM. Through the figure, it can be clearly seen that the lattice of $Ti_2ZnC$ is formed by alternately stacking Zn atom layers and $Ti_2C$ layers.

Example 3: in this example, the novel MAX phase material is $Ti_2ZnN$, the precursor MAX phase is $Ti_2AlN$, the Zn-containing material is Zn powder, the inorganic salt is NaBr, and these raw materials are all commercially available. The preparation method of $Ti_2ZnN$ is as follows:

(1) 10.3 g of NaBr, 4.2 g of $Ti_2AlN$ powder having a particle size of 20 μm and 3 g of Zn powder having 300 meshes were weighed, and the above materials were ground and mixed to obtain a mixed product.

(2) The mixture was placed in a corumdum crucible to react in a high-temperature tubular furnace. Reaction conditions were as follows: 1100° C., 30 min, and argon protection. After the temperature of the tubular furnace was reduced to room temperature, a reaction product in the crucible was taken.

(3) The reaction product was washed with deionized water: the reaction product was put in a flask, deionized water was added, the above materials were stirred and ultrasonically washed for 30 min and then subjected to standing for 1 h, and supernatant was discarded. After being washed three times, the reaction product was put into a 80° C. oven and taken out after 24 h, so as to obtain a solid product.

Figure 8:
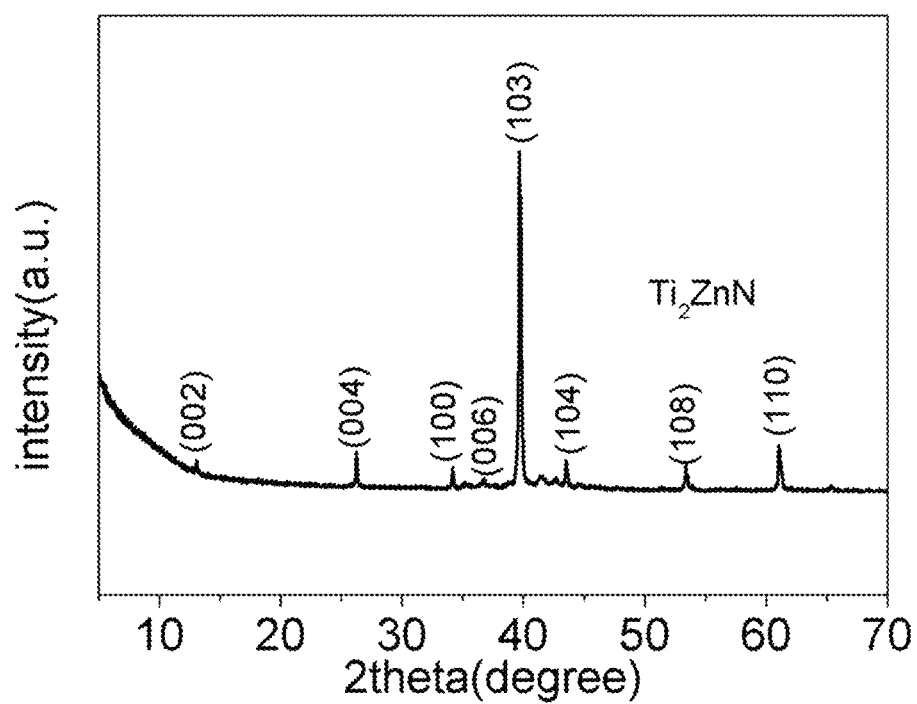
FIG. 8 is an XRD spectrogram of an energy spectrum analysis diagram of MAX phase material $Ti_3ZnN$ in example 3 of the present application.

FIG. 8 is the XRD spectrogram of the above prepared solid product $Ti_2ZnN$. The XRD spectrogram of $Ti_2ZnN$ has obvious (002), (004) and (006) diffraction peaks, indicating $Ti_2ZnN$ has a good orientation degree along the (00l) face, wherein, the (002) diffraction peak is located near 13°, and the c value of the corresponding lattice constant is about 1.354 nm which is close to that of 211 type MAX phase such as $Ti_2AlN$.

Figure 9:
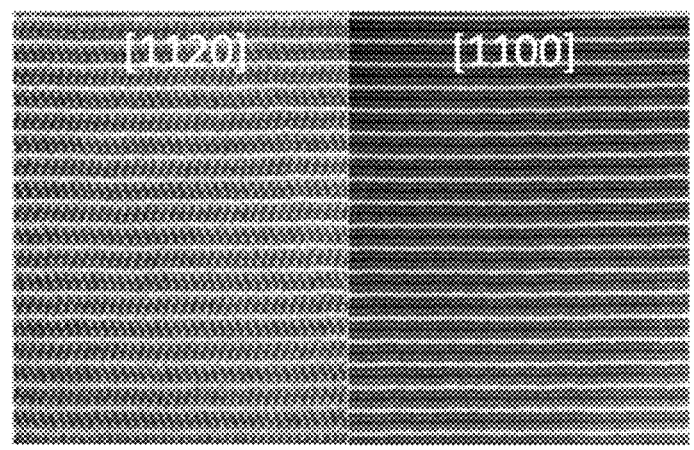
FIG. 9 is an HRTEM image of MAX phase material $Ti_3ZnN$ in example 3 of the present application along different crystal zone axes.

FIG. 9 shows the HRTEM morphology of $Ti_2ZnN$ observed along different crystal zone axes. The layered crystal structure of $Ti_2ZnN$ can be obviously seen through the figure, a layer with high brightness in the figure is a Zn atom layer whose atom number is large, and a layer with low brightness is a $Ti_2N$ layer.

Figure 10:
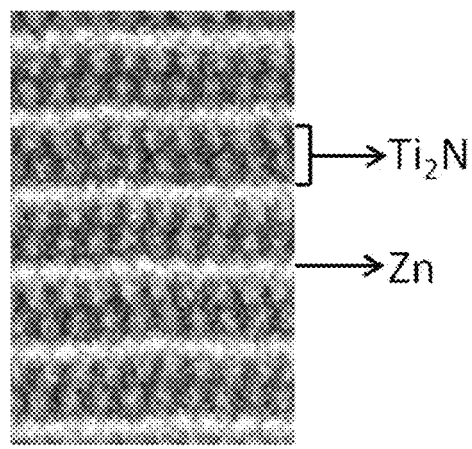
FIG. 10 is an energy spectrum analysis diagram of MAX phase material $Ti_3ZnN$ in example 3 of the present application under a high-resolution transmission electron microscope.

FIG. 10 shows microstructure analysis of $Ti_2ZnN$ under the HRTEM. Through the figure, it can be clearly seen that the lattice of $Ti_2ZnN$ is formed by alternately stacking Zn atom layers and $Ti_2N$ layers.

Example 4: in this example, the novel MAX phase material is $V_2ZnN$, the precursor MAX phase is $V_2AlC$, the Zn-containing material is Zn powder, the inorganic salt is NaCl, and these raw materials are all commercially available. The preparation method of $V_2ZnN$ is as follows:

(1) 5.84 g of NaCl, 4.34 g of $V_2AlC$ powder having a particle size of 10 μm and 3 g of Zn powder having 300 meshes were weighed, and the above materials were ground and mixed to obtain a mixed product.

(2) The mixture was placed in a corumdum crucible to react in a high-temperature tubular furnace. Reaction conditions were as follows: 800° C., 30 min, and argon protection. After the temperature of the tubular furnace was reduced to room temperature, a reactant in the crucible was taken.

(3) The reaction product was washed with deionized water: the reaction product was put in a flask, deionized water was added, the above materials were stirred and ultrasonically washed for 30 min and then subjected to standing for 1 h, and supernatant was discarded. After being washed three times, the reaction product was put into a 80° C. oven and taken out after 24 h, so as to obtain a solid product.

Figure 11:
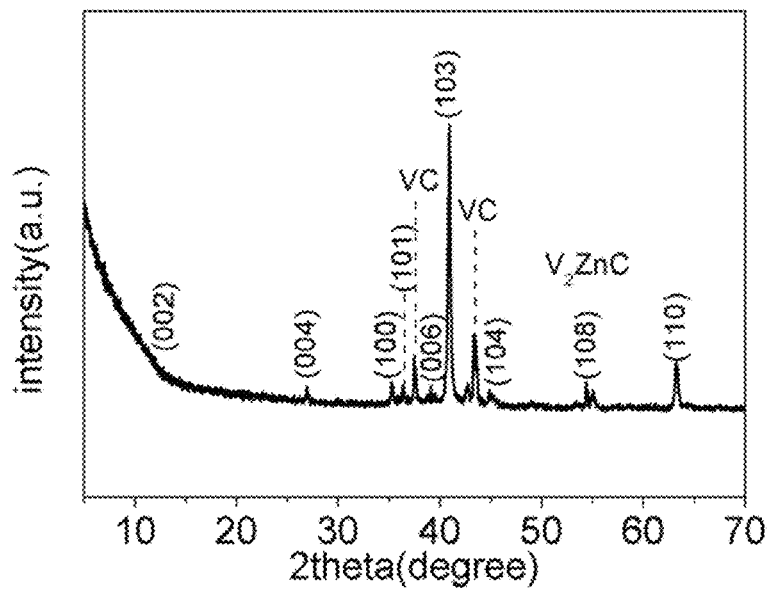
FIG. 11 is an XRD spectrogram of MAX phase material $V_2ZnC$ in example 4 of the present application.

FIG. 11 is the XRD spectrogram of the above prepared solid product $V_2ZnC$. The XRD spectrogram of $V_2ZnC$ has obvious (004) and (006) diffraction peaks, indicating $V_2ZnC$ has a good orientation degree along the (00l) face, wherein, the (004) diffraction peak is located near 26°, and the c value of the corresponding lattice constant is about 1.323 nm which is close to that of 211 type MAX phase such as $V_2AlC$.

In addition, the inventor of the present application conducts relevant experiments by replacing corresponding raw materials and process conditions in the foregoing examples 1-4 with other raw materials and process conditions described in this description. Results show that Z element-based MAX phase materials can be obtained.

Example 5: in this example, the novel ternary layered MAX phase material is $Ti_3CuC_2$, the precursor is $Ti_3AlC_2$, the Cu-containing material is Cu powder, the inorganic salt is NaCl, and these raw materials are all commercially available. The preparation method of $Ti_3CuC_2$ is as follows:

(1) 5.85 g of NaCl, 6 g of $Ti_3AlC_2$ powder and 1.2 g of Cu powder having 300 meshes were weighed, and the above materials were ground and mixed to obtain a mixed product.

(2) The mixture was placed in a corumdum crucible to react in a high-temperature tubular furnace. Reaction conditions were as follows: 900° C., 120 min, and argon protection. After the temperature of the tubular furnace was reduced to room temperature, a reactant in the crucible was taken.

(3) The reaction product was washed with deionized water: the reaction product was put in a flask, deionized water was added, the above materials were stirred and ultrasonically washed for 30 min and then subjected to standing for 1 h, and supernatant was discarded. After being washed three times, the reaction product was washed with ethanol, and then the washed reactant was put into a 40° C. oven and taken out after 12 h, so as to obtain a solid product.

Figure 12:
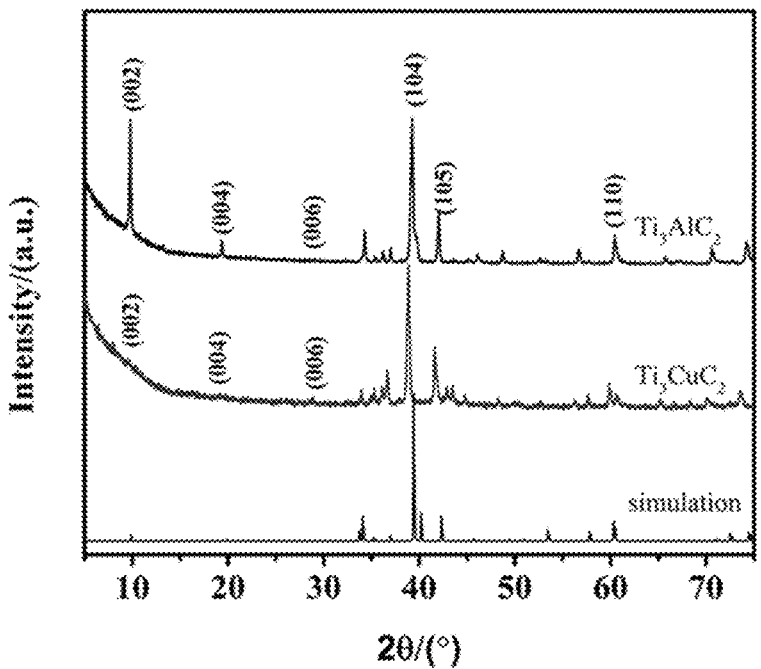
FIG. 12 is an XRD spectrogram of ternary layered MAX phase material $Ti_3CuC_2$ in example 3 of the present application and the traditional MAX phase material $Ti_3AlC_2$.

FIG. 12 shows comparison between the XRD spectrograms of the above prepared solid product $Ti_3CuC_2$ and the traditional MAX phase material $Ti_3AlC_2$. Through comparison, it can be seen that peak positions of the XRD spectrograms of the above prepared solid product $Ti_3CuC_2$ and the traditional MAX phase material $Ti_3AlC_2$ are similar in a whole, and the XRD spectrograms of the above prepared solid product $Ti_3CuC_2$ and the traditional MAX phase material $Ti_3AlC_2$ both have diffraction peaks orientated along the (00l) face such as (002), (004) and (006), indicating that their crystals can grow preferably along the (00l) face in the process of crystal growth, and thus exhibit a layered structure in a microstructure. The XRD simulated by calculation can be well consistent to an experiment result. Meanwhile, the XRD peak of the synthesized $Ti_3CuC_2$ has a tendency of shifting toward a low angle compared with that of $Ti_3AlC_2$, it is possibly because of difference in radius sizes of A-position atoms and difference in their lattice parameters. By calculation, the c value of the lattice constant of $Ti_3CuC_2$ is 18.53 Å which is close to the c value 18.57 Å of lattice constant of $Ti_3AlC_2$. XRD data sufficiently shows the $Ti_3CuC_2$ material prepared in this example has a crystal structure similar to that of $Ti_3AlC_2$, and is a ternary layered MAX phase material having a P63/mmc space group structure.

Figure 13:
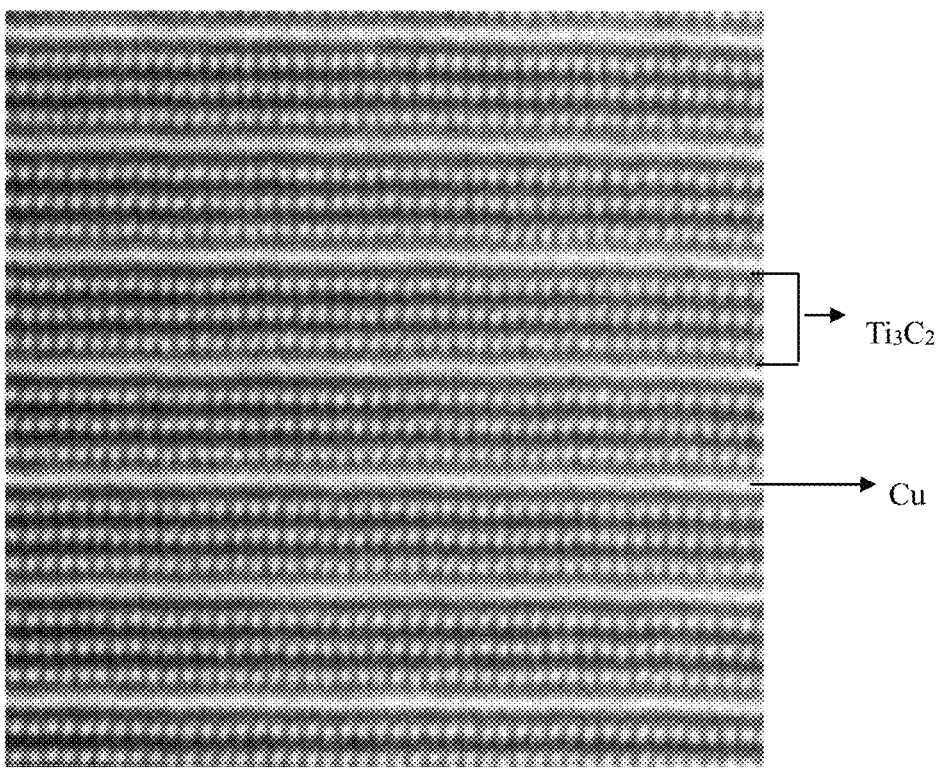
FIG. 13 is an HRTEM image of ternary layered MAX phase material $Ti_3CuC_2$ in example 5 of the present application.

FIG. 13 shows the HRTEM morphology of $Ti_3CuC_2$ observed along different crystal zone axes. Through the figure, it can be obviously seen that $Ti_3CuC_2$ has the layered crystal structure of the typical 312 MAX phase material, a layer with high brightness in the figure is a Cu atom layer whose atom number is large, and a layer with low brightness is a $Ti_3C_2$ layer, it can be seen that the lattice of $Ti_3CuC_2$ is formed by alternately stacking Cu atom layers having high brightness and $Ti_3C_2$ layers having low brightness.

Example 6: in this example, the novel ternary layered MAX phase material is a $Ti_3CuC_2$ bulk material the precursor MAX phase is $Ti_3AlC_2$, the Cu-containing material is Cu, and these raw materials are all commercially available. The preparation method of $Ti_3CuC_2$ is as follows:

(1) 2 g of $Ti_3AlC_2$ powder having particle size of 30 μm and 2 g of Cu powder were weighed, and the above materials were ground and mixed to obtain a mixed product.

(2) 2 g of the above powder mixture was weighed and placed in a graphite die and then sintered through SRS. Sintering conditions were as follows: 1100° C., preservation for 60 min, temperature rising rate was 100° C./min, argon protection and the voltage was 30 MPa. After the reaction was ended, a product was taken.

(3) The graphite paper on the surface of the obtained bulk was removed, the surface of the bulk was polished through abrasive paper having different meshes until the mirror surface was formed, and the polished bulk was dried under the condition of 80° C., and taken after 12 h, so as to obtain the $Ti_3CuC_2$ bulk material.

Figure 14:
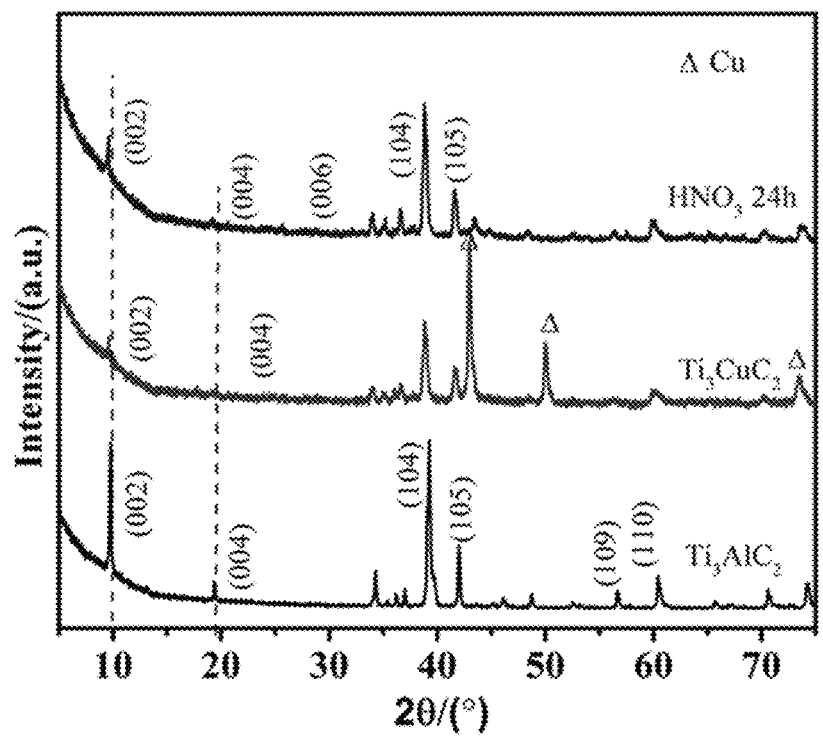
FIG. 14 is an XRD spectrogram of ternary layered MAX phase material $Ti_3CuC_2$ in example 6 of the present application and the traditional MAX phase material $Ti_3AlC_2$.

FIG. 14 shows comparison between the XRD spectrogram of the $Ti_3CuC_2$ bulk material obtained after SRS sintering and the traditional MAX phase material $Ti_3AlC_2$. It can be seen from FIG. 14 that the surface of the obtained bulk material contains copper elementary substance except $Ti_3CuC_2$, which is possibly caused by excessive Cu elementary substance added in the raw materials. After excessive Cu elementary substance is dissolved with nitric acid, the diffraction peaks of the obtained XRD spectrogram are similar to those of the $Ti_3AlC_2$ 312 phase in a whole, indicating that the $Ti_3CuC_2$ bulk material is prepared.

Figure 15A:
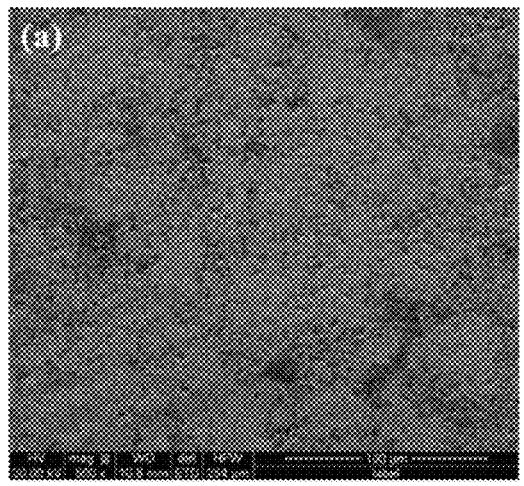
FIG. 15a and FIG. 15b are respectively SEM images of the surface and the cross section of ternary layered MAX phase material $Ti_3CuC_2$ in example 6 of the present application.
Figure 15B:
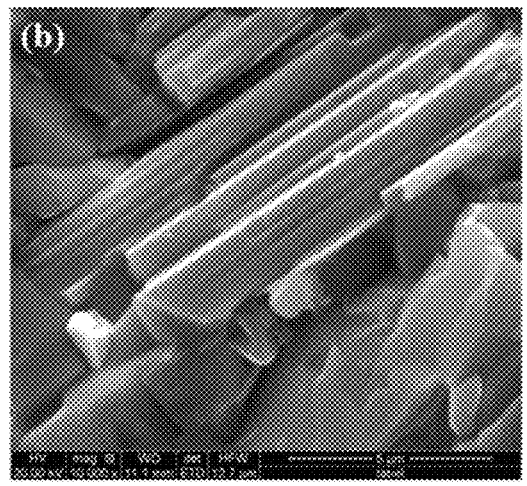

FIG. 15 a and FIG. 15 b are the SEM image and the EDS diagram of the section of the $Ti_3CuC_2$ bulk material obtained by SRS sintering. It can be seen from the figures that the morphology is exhibited as the typical layered structure of the MXA phase material, indicating that the obtained material is a novel MAX phase material of $Ti_3CuC_2$ with Cu element at the position A.

Example 7: in this example, the novel ternary layered MAX phase material is $Ti_2CuN$, the precursor is $Ti_2AlN$, the Cu-containing material is Cu powder, the inorganic salt is KCl, and these raw materials are all commercially available. The preparation method of $Ti_2CuN$ is as follows:

(1) 7.45 g of KCl, 6 g of $Ti_2AlN$ powder having particle size of 10 μm and 2.4 g of Cu powder having 300 meshes were weighed, and the above materials were ground and mixed to obtain a mixed product.

(2) The above powder mixture placed in a corundum crucible to react in a high-temperature tubular furnace. Reaction conditions were as follows: 600° C., preservation for 420 min, and argon protection. After the temperature of the tubular furnace was reduced to room temperature, a reaction product was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 60° C. oven, and then taken after 12 h, so as to obtain a power product.

Figure 16:
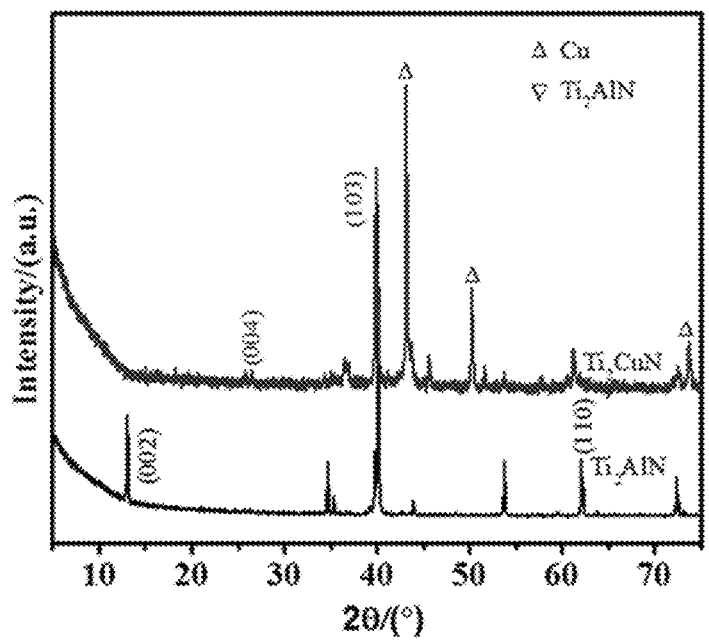
FIG. 16 is an XRD spectrogram of ternary layered MAX phase material $Ti_2CuN$ in example 7 of the present application and the traditional MAX phase material $Ti_2AlN$.
Figure 17A:
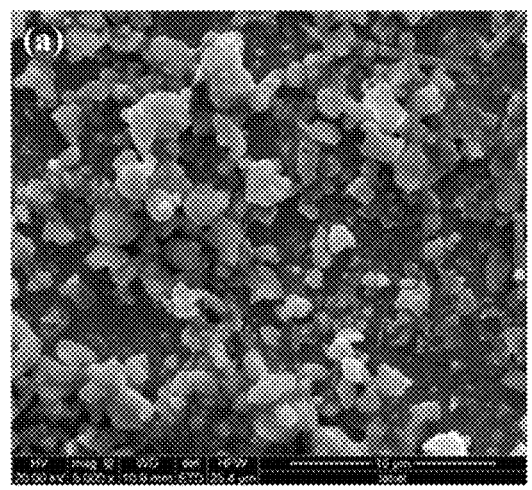
FIG. 17a and FIG. 17b are respectively an SEM image and an EDS analysis diagram of ternary layered MAX phase material $Ti_2CuN$ in example 7 of the present application.
Figure 17B:
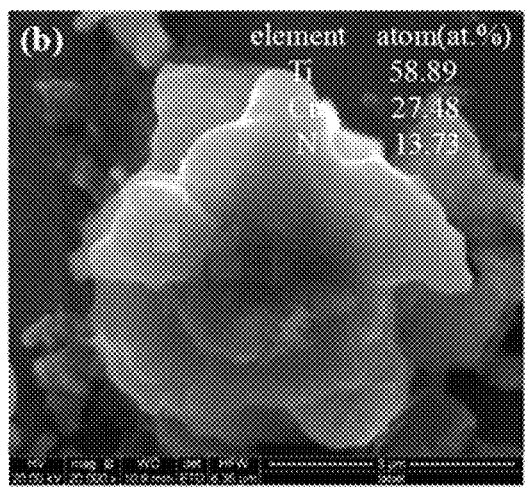

FIG. 16 shows comparison between the XRD spectrograms of the $Ti_2CuN$ MAX phase material and the traditional MAX phase $Ti_2AlN$. It can be seen from FIG. 16 that through comparison, the XRD spectrogram of the obtained novel ternary layered MAX phase material is basically similar to that of $Ti_2AlN$, but many crystal faces of the obtained novel ternary layered MAX phase material are weakened relative to $Ti_2AlN$, which is possibly because of difference in radius sizes of A-position atoms and difference in their lattice parameters. XRD proves the novel MAX phase material is obtained FIG. 17 a and FIG. 17 b are the SEM image and the EDS diagram of the prepared $Ti_3CuN$ MAX phase powder material. It can be seen from the figures that the morphology is basically consistent to that of $Ti_2AlN$ obtained by a molten-salt method. The EDS result indicates that the surface of the particle contains three elements Ti, Cu and N, and a Ti/Cu ratio is approximate to 2:1. It is confirmed by combination of XRD results and SEM results that the synthesized substance is a novel $Ti_2CuN$ MAX phase material.

Example 8: in this example, the novel ternary layered MAX phase material is $Ti_2CuN$, the precursor MAX phase material is $Ti_2AlN$, the Cu-containing material is CuO powder, the inorganic salts are NaCl and KCl, and these raw materials are all commercially available. The preparation method of $Ti_2CuN$ is as follows:

(1) 4.8 g of NaCl, 6.2 g of KCl, 3 g of $Ti_2AlN$ powder and 3 g of Cu powder having 300 meshes were weighed, and the above materials were ground and mixed to obtain a mixed product.

(2) The above mixture was placed in a corundum crucible to react in a high-temperature tubular furnace. Reaction conditions were as follows: 1000° C., preservation for 180 min, and argon protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 60° C. oven, and then taken after 12 h, so as to obtain a power product.

Figure 18:
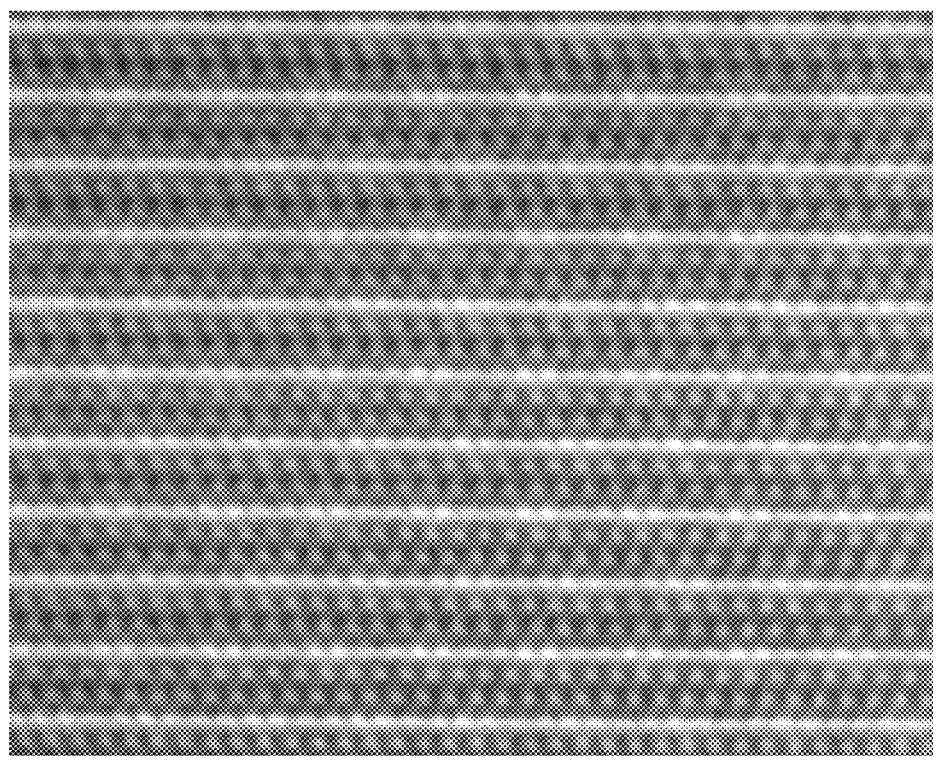
FIG. 18 is an HRTEM image of ternary layered MAX phase material $Ti_2CuN$ in example 8 of the present application.

FIG. 18 shows the HRTEM morphology of $Ti_2CuN$. Through the figure, it can be obviously seen that $Ti_2CuN$ has the layered crystal structure of the typical 312 MAX phase material, a layer with high brightness in the figure is a Cu atom layer whose atom number is large, and a layer with low brightness is $Ti_2N$, it can be seen that the lattice of $Ti_2CuN$ is formed by alternately stacking Cu atom layers having high brightness and $Ti_2N$ layers having low brightness.

Figure 19:
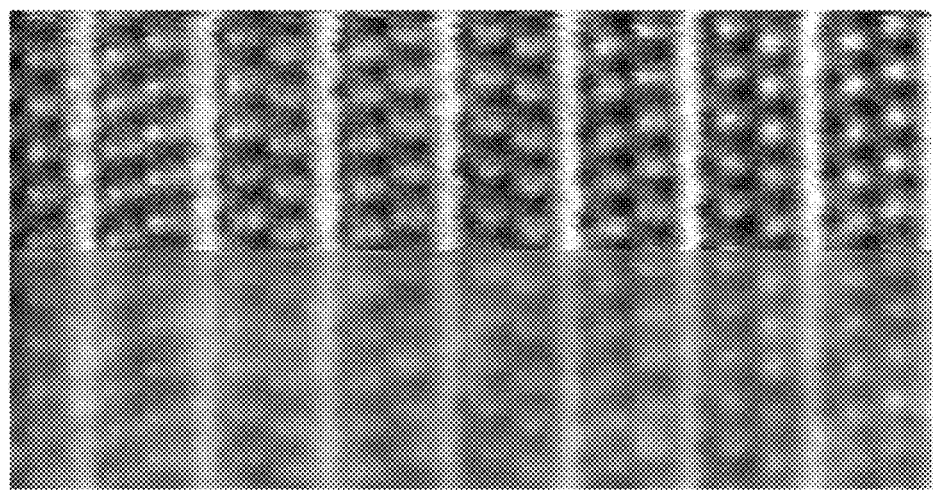
FIG. 19 is an EDS analysis diagram of ternary layered MAX phase material $Ti_2CuN$ in example 8 of the present application under a high-resolution transmission electron microscope.
Figure 19:
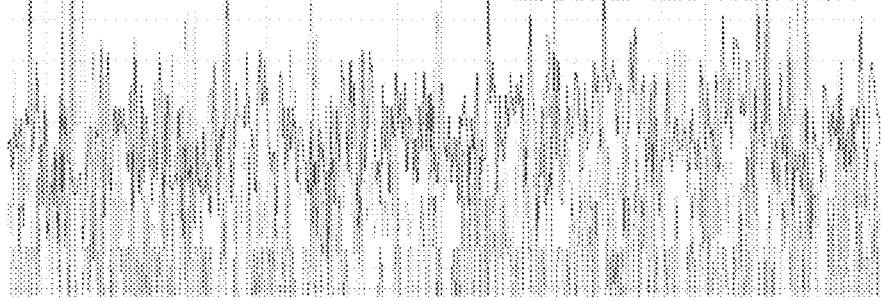

FIG. 19 shows element analysis of $Ti_2CuN$ under the HRTEM. An element face distribution result indicates that the Cu element is mainly located at the position A. In addition, there are a few of Al elements at the position A, EDX shows Ti: (Al+Cu)≈2:1, and Cu: (Cu+Al)≈0.87, indicating that Al on the A layer is basically replaced by the Cu atom so as to obtain the $Ti_2CuN$ MAX phase material.

Example 9: in this example, the novel ternary layered MAX phase material is $Ti_2(Cu_xIn_{1-x})C$, the raw material is $Ti_2InC$, the inorganic salts are NaBr and KBr, and these raw materials are all commercially available. The preparation method of $Ti_2(Cu_xIn_{1-x})C$ is as follows:

(1) 2.4 g of NaBr, 3.1 g of KBr, 2 g of $Ti_2InC$ powder and 1.2 g of Cu powder having 300 meshes were weighed, and the above materials were ground and mixed to obtain a mixed product.

(2) The above mixture was placed in a corundum crucible to react in a high-temperature tubular furnace. Reaction conditions were as follows: 750° C., preservation for 600 min, and argon protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 50° C. oven, and then taken after 24 h, so as to obtain a power product.

Figure 20:
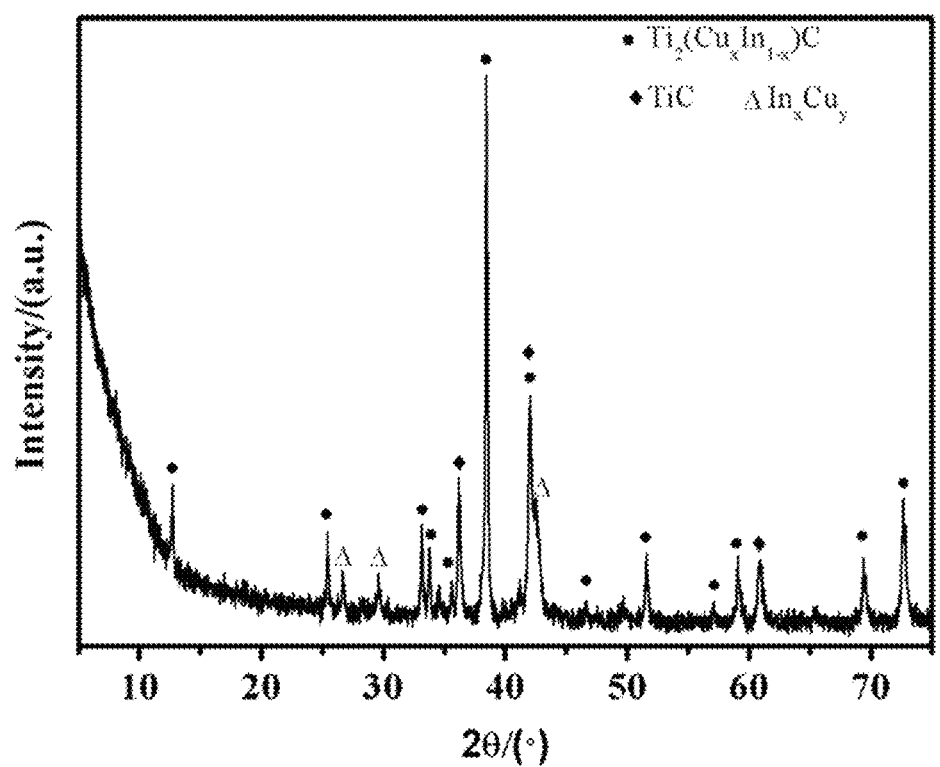
FIG. 20 is an XRD spectrum of ternary layered MAX phase material Ti$_2$(Cu$_x$In$_{1-x}$)C in example 9 of the present application.

FIG. 20 is the XRD spectrogram of the prepared $Ti_2(Cu_xIn_{1-x})C$ MAX phase material. It can be seen from FIG.

20 that the XRD spectrogram of the obtained novel ternary layered MAX phase material is basically similar to that of the 211 MAX phase, indicating that the obtained new phase is the MAX phase material with Cu at the position A. In addition, the XRD result shows that a CuIn alloy phase and TiC are also present in the product.

Figure 21A:
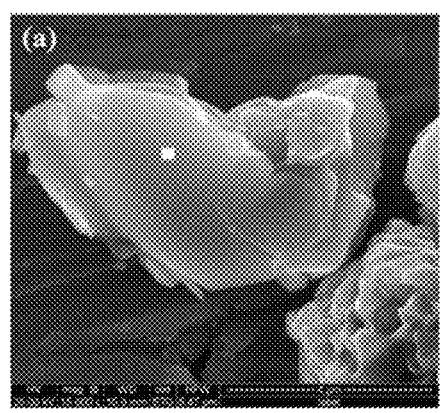
FIG. 21a and FIG. 21b are respectively an SEM image and an EDS analysis diagram of ternary layered MAX phase material Ti$_2$(Cu$_x$In$_{1-x}$)C in example 9 of the present application.
Figure 21B:
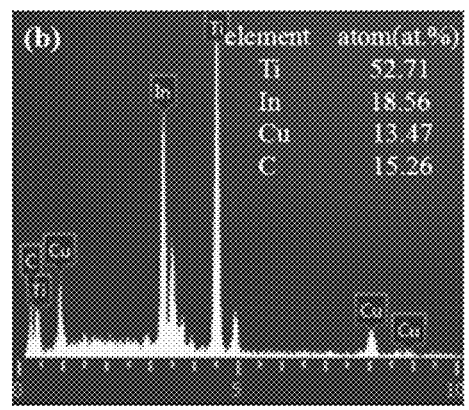

FIG. 21a and FIG. 21b are the SEM image and the EDS diagram of the prepared $Ti_3CuN$ MAX phase powder material. It can be seen from the figures that the morphology is the layered structure of the typical MAX phase material. The EDS result shows the surface of the particle contains four elements Ti, Cu, In and C, and Ti: (Cu+In)≈2:1, In: (Cu+In)≈0.6, indicating that the Cu atom mainly enters into the position A of the MAX phase to obtain the novel MAX phase material $Ti_2(Cu_xIn_{1-x})C$ with Cu at the position A.

Example 10: in this example, the novel ternary layered MAX phase material is $V_2(Cu_xAl_{1-x})C$, the precursor is $V_2AlC$ powder, Cu is Cu powder, the inorganic salts are NaCl and KCl, and these raw materials are all commercially available. The preparation method of $V_2(Cu_xAl_{1-x})C$ is as follows:

(1) 3.6 g of NaCl, 4.65 g of KCl, 1 g of $V_2AlC$ powder having 300 meshes and 1.2 g of Cu powder having 300 meshes were weighed, and the above materials were ground and mixed to obtain a mixed product.

(2) The above mixture was placed in a corundum crucible to react in a high-temperature tubular furnace. Reaction conditions were as follows: 400° C., preservation for 720 min, and argon protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 88° C. oven, and then taken after 24 h, so as to obtain a power product.

Figure 22:
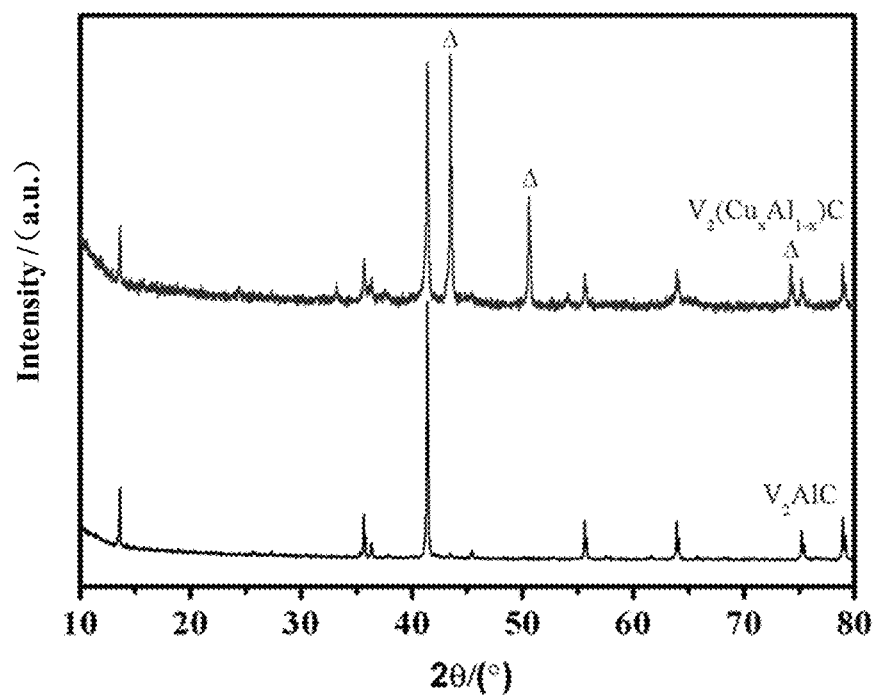
FIG. 22 is an XRD spectrum of ternary layered MAX phase material V$_2$(Cu$_x$Al$_{1-x}$)C in example 10 of the present application.

FIG. 22 is the XRD spectrogram of the prepared $V_2(Cu_xAl_{1-x})C$ MAX phase material. It can be seen from FIG. 22 that the XRD spectrogram of the obtained novel ternary layered MAX phase material is basically similar to that of the 211 $V_2AlC$ MAX phase, and Cu elementary substance is present in the obtained novel ternary layered MAX phase material, indicating that the obtained new phase is the Cu-containing MAX phase material in which Cu is mainly present in the position A of the MAX phase.

Example 11: in this example, the novel ternary layered MAX phase material is $Ti_3CuC_2$, the precursor material is $Ti_3AlC_2$, CuO powder having 300 meshes is 1.5 g, the inorganic salts are NaCl and KCl, and these raw materials are all commercially available. The preparation method of $Ti_3CuC_2$ is as follows:

(1) 1.2 g of NaCl, 1.55 g of KCl, 6 g of $Ti_3CuC_2$ powder, 1.5 g of CuO powder having 300 meshes, 1.5 g of Al powder and 0.48 g of carbon powder having 300 meshes were weighed, and the above materials were ground and mixed to obtain a mixed product.

(2) The above mixture was placed in a corundum crucible to react in a high-temperature tubular furnace. Reaction conditions were as follows: 800° C., preservation for 300 min, and argon protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 45° C. oven and then taken after 24 h, so as to obtain a power product.

Figure 23:
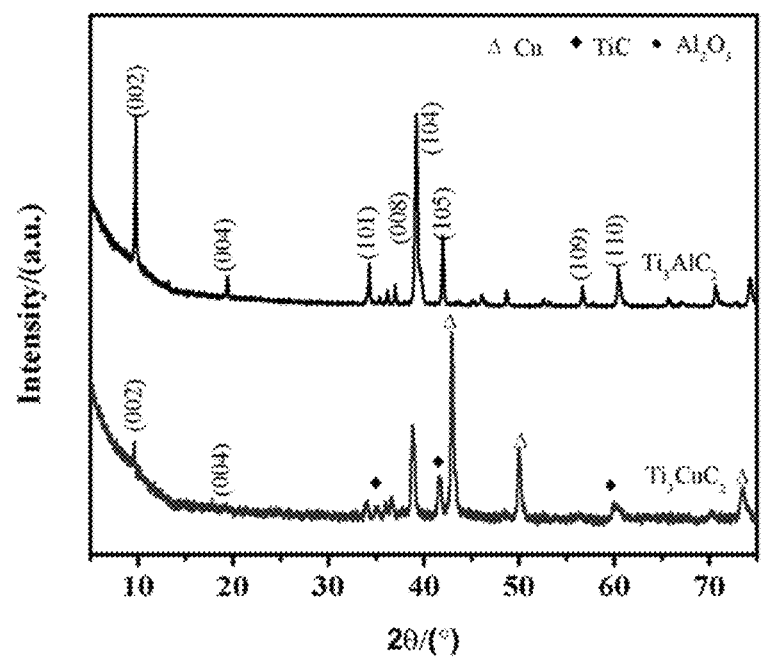
FIG. 23 is an XRD spectrum of ternary layered MAX phase material Ti$_3$Cu$_2$C$_2$ in example 11 of the present application.

FIG. 23 is the XRD spectrogram of the prepared $Ti_3CuC_2$ MAX phase material. It can be seen from FIG. 23 that the XRD spectrogram of the obtained novel ternary layered $Ti_3CuC_2$ MAX phase material is basically similar to that of the 311 $Ti_3AlC_2$ MAX phase, and Cu elementary substance is present in the obtained novel ternary layered $Ti_3CuC_2$ MAX phase material, indicating that Cu after replacement reaction of Al and CuO enters into the MAX phase material, and the finally obtained new phase is Cu-containing MAX phase material in which Cu is mainly present in the position A of the MAX phase.

Wherein, examples of ternary layered MAX phase materials with Co, Ni, Fe and Mn elements at the position A refer to example 12-example 18.

Example 12: in this example, the ternary layered MAX phase material with magnetic elements at the position A is $V_2(Sn_zFe_{1-z})C$ powder material, the precursor is $V_2AlC$, a Sn-containing material is Sn powder, and a Fe-containing material is Fe powder. The preparation method of the $V_2(Sn_zFe_{1-z})C$ powder is as follows:

(1) 1.2 g of NaCl, 1.5 g of KCl, 2 g of $V_2AlC$ powder, 1.3 g of Sn powder having 300 meshes and 0.56 g of Fe powder having 300 meshes were weighed, and the above materials were ground and mixed to obtain a mixture.

(2) The above mixture was placed in a corundum crucible to react in a high-temperature tubular furnace. Reaction conditions were as follows: 1300° C., preservation for 300 min, and inert atmosphere protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 40° C. oven, and then taken after 12 h, so as to obtain a power product.

Figure 24:
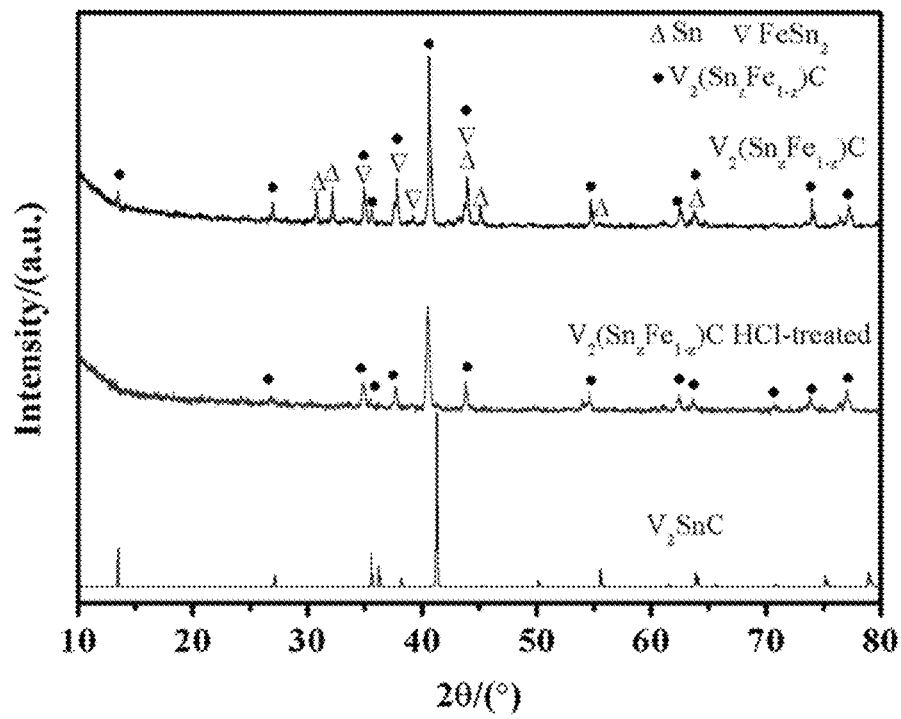
FIG. 24 is an XRD spectrum of ternary layered MAX phase material V$_2$(Sn$_z$Fe$_{1-z}$)C with a magnetic element at the position A before and after treatment and stimulated V$_2$SnC MAX phase material in example 12 of the present application.

FIG. 24 is an XRD spectrogram of $V_2(Sn_zFe_{1-z})C$ MAX phase powder material prepared by the molten-salt method before and after treatment with hydrochloric acid and $V_2SnC$ stimulated by calculation. It can be seen from the XRD spectrogram that in addition to $V_2(Sn_zFe_{1-z})C$, a Sn elementary substance and a $FeSn_2$ alloy phase are present. After treatment with hydrochloric acid, the Sn elementary substance and the $FeSn_2$ alloy phase are both removed, and the rest is the $V_2(Sn_zFe_{1-z})C$ MAX phase material. Through comparison with the standard $V_2SnC$ XRD spectrogram, after the Fe element is doped at the position A, the XRD diffraction peaks are shifted toward the low angle in a whole, and the (002) crystal face is weak, which is possibly because of difference in radius sizes of A-position atoms and finally leads to difference in their lattice parameters.

Figure 25A:
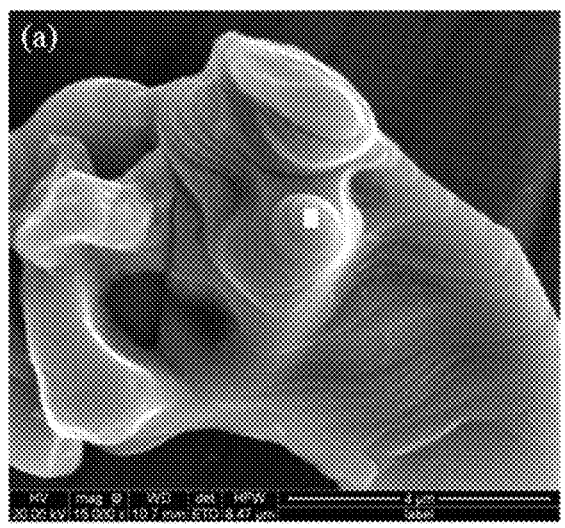
FIG. 25 a and FIG. 25b are respectively an SEM image and an EDS diagram of ternary layered MAX phase material V$_2$(Sn$_z$Fe$_{1-z}$)C with a magnetic element at the position A in example 12 of the present application.
Figure 25B:
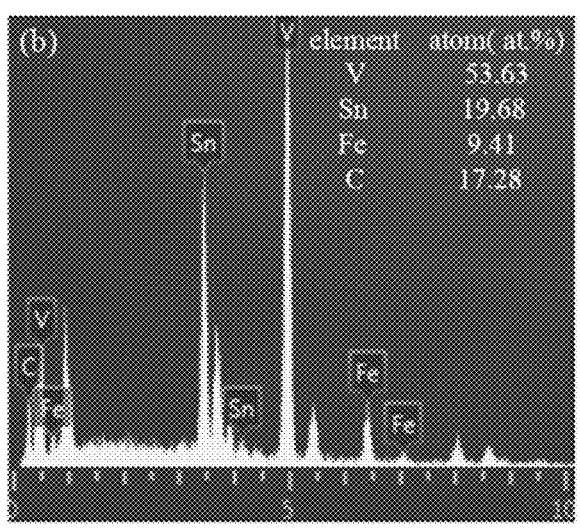

FIG. 25a and FIG. 25b are respectively the SEM picture and the EDS diagram of ternary layered MAX phase material $V_2(Sn_zFe_{1-z})C$. It can be seen from the figures that the obtained $V_2(Sn_zFe_{1-z})C$ presents the typical layered structure of the MAX phase material, indicating that the new material is the layered MAX phase material. The EDS energy spectrum shows that V: (Sn+Fe)≈2:1, and Sn:Fe≈2:1. Thus, it can be determined that the ratio of atoms with Fe at the position A is about ⅓, and the chemical expression of the obtained novel MAX phase material is $V_2(Sn_{2/3}Fe_{1/3})C$.

Example 13: in this example, the ternary layered MAX phase material with magnetic elements at the position A is a $V_2(Sn_zFe_{1-z})C$ powder material, the precursor is $V_2AlC$, a Sn-containing material is Sn powder, and a Fe-containing material is Fe powder. The preparation method of $V_2(Sn_zFe_{1-z})C$ is as follows:

(1) 2.4 g of NaCl, 3.1 g of KCl, 3 g of $V_2AlC$ powder, 1.3 g of Sn powder having 300 meshes and 0.34 g of Fe powder having 300 meshes were weighed, and the above materials were ground and mixed to obtain a mixed product.

(2) The above mixture was placed in a corundum crucible to react in a high-temperature tubular furnace. Reaction conditions were as follows: 900° C., preservation for 420 min, and inert atmosphere protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 40° C. oven, and then taken after 12 h, so as to obtain a power product.

FIG. 26a and FIG. 26b respectively show HRTEM morphologies of ternary layered MAX phase material $V_2(Sn_zFe_{1-z})C$ along different crystal zone axes. It can be obviously seen from the figures that $V_2(Sn_zFe_{1-z})C$ has the layered crystal structure of the typical 211 MAX phase material, a layer with high brightness is an A atom layer whose atom number is large, and has element compositions Fe and Sn, and a layer with low brightness is $V_2C$. It can be seen that the lattice of $V_2(Sn_zFe_{1-z})C$ is formed by alternately stacking Fe/Sn atom layers with high brightness and $V_2C$ layers with low brightness.

FIG. 27 shows energy spectrum analysis of $V_2(Sn_zFe_{1-z})C$ under the HRTEM. The energy spectrum result shows the Fe element is mainly located at the position A. Through the figure, it can be clearly seen that the lattice of $V_2(Sn_zFe_{1-z})C$ is formed by alternately stacking Fe/Sn atom layers of the A layer and $V_2C$ layers, and V: (Sn+Fe)≈2:1, and Sn:Fe≈2:1, which can be well consistent to the energy spectrum result of SEM, so the chemical expression of the obtained novel MAX phase material is $V_2(Sn_{2/3}Fe_{1/3})C$.

Figure 28:
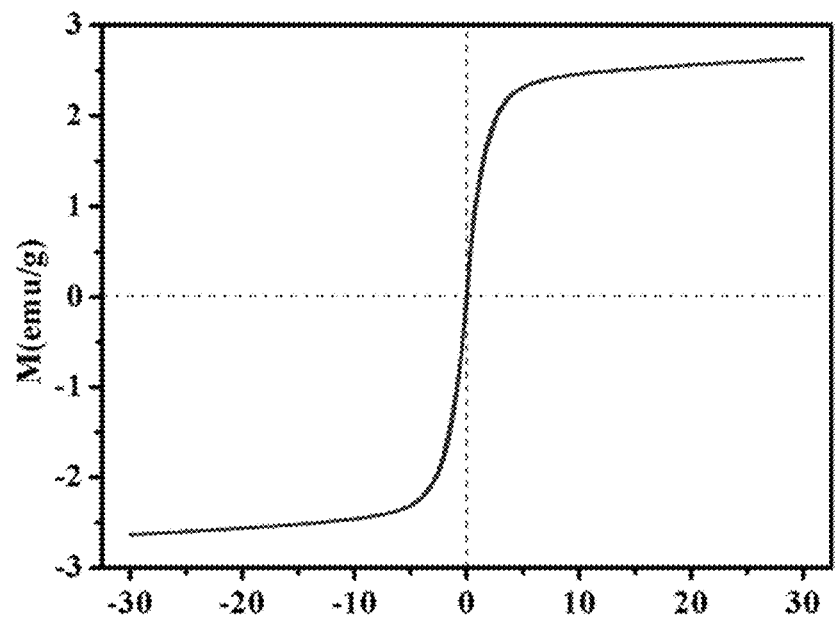
FIG. 28 is a magnetic hysteretic curve of ternary layered MAX phase material V$_2$(Sn$_z$Fe$_{1-z}$)C with a magnetic element at the position A at 300K after treatment with hydrochloric acid in example 13 of the present application.

FIG. 28 is a magnetic hysteretic curve of ternary layered compound $V_2(Sn_zFe_{1-z})C$ at 300K after treatment with hydrochloric acid. It can be seen from the figure that the ternary layered compound $V_2(Sn_zFe_{1-z})C$ presents good magnetic response, the magnetic hysteretic curve at room temperature is of "S" shape, the coercive force and residual magnetization intensity are close to 0, indicating that this material has a typical soft magnetic characteristic, and its maximum saturated magnetization intensity is 2.63 emu/g.

Example 14: in this example, the ternary layered MAX phase material with magnetic elements at the position A is a $V_2(Sn_zFe_{1-z})C$ bulk material, the precursor is $V_2AlC$, a Sn-containing material is Sn powder, and a Fe-containing material is Fe powder. The preparation method of the $V_2(Sn_zFe_{1-z})C$ bulk material is as follows:

(1) 3 g of $V_2AlC$ powder, 1.3 g of Sn powder having 300 meshes and 1 g of Fe powder having 300 meshes were weighed, and the above materials were ground and mixed to obtain a mixed product.

(2) The above powder mixture was placed in a graphite die and then sintered through SRS. Sintering conditions were as follows: 1100° C., preservation for 120 min, the temperature rising rate was 100° C./min, argon protection and the voltage was 37 MPa. After the reaction was ended, a reaction product was taken.

(3) The graphite paper on the surface of the obtained bulk was removed, the surface of the bulk was polished through abrasive paper having different meshes until the mirror surface was formed, the polished bulk was put in a 100° C. oven and taken after 12 h, so as to obtain the bulk material.

Figure 29:
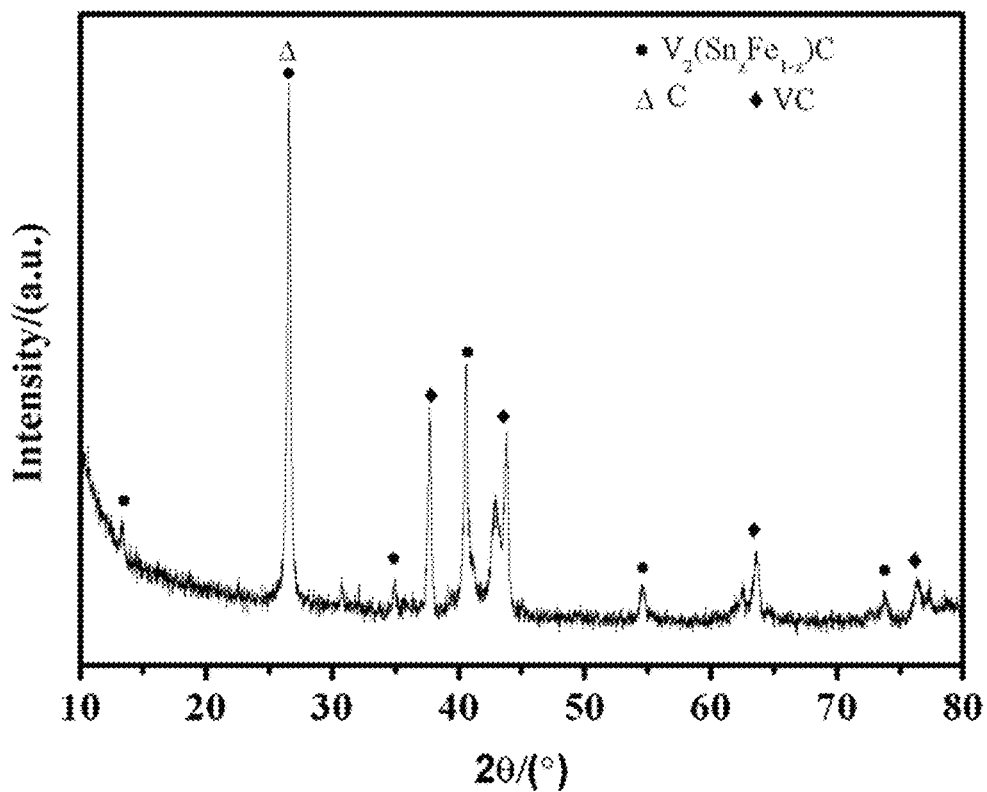
FIG. 29 is an XRD spectrum of ternary layered MAX phase material V$_2$(Sn$_z$Fe$_{1-z}$)C with a magnetic element at the position A in example 14 of the present application.

FIG. 29 shows the XRD spectrogram of SPS under the condition of 1000° C. It can be seen from the figure that the obtained material phases comprise $V_2(Sn_zFe_{1-z})C$, C, VC and Sn elementary substance, and the obvious $FeSn_2$ alloy phase is not detected. It can be seen from the figure that the characteristic peaks of the 211 MAX phase appear, C peak is because the graphite paper on the surface is not completely polished; in addition, V and C caused due to insufficient reaction form a large amount of VC at high temperature.

Figure 30A:
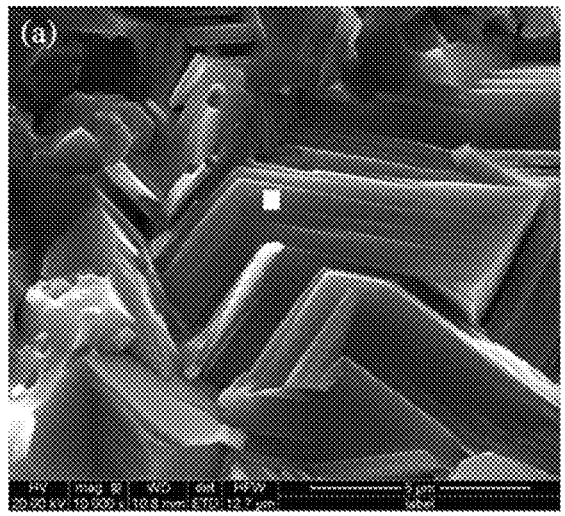
FIG. 30a and FIG. 30b are respectively an SEM image and an EDS analysis diagram of ternary layered MAX phase material V$_2$(Sn$_z$Fe$_{1-z}$)C with a magnetic element at the position A in example 14 of the present application.
Figure 30B:
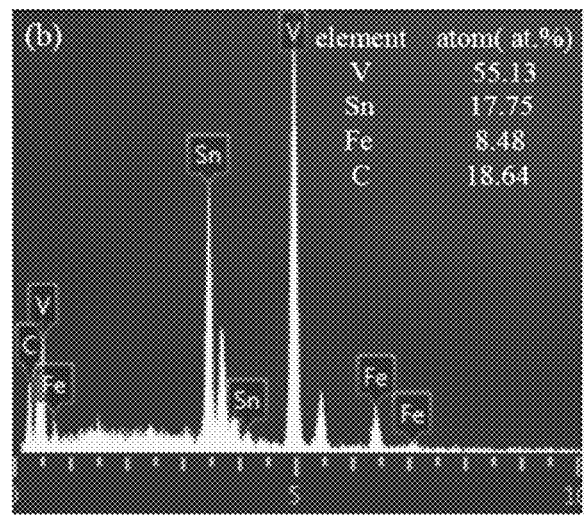

FIG. 30a and FIG. 30b are respectively the SEM image and the EDS diagram of the $V_2(Sn_zFe_{1-z})C$ material obtained by SPS sintering. It can be seen from the figure that the obtained $V_2(Sn_zFe_{1-z})C$ presents the typical layered structure of the MAX phase material, indicating that the obtained new material is the layered MAX phase material. EDS energy spectrum shows V: (Sn+Fe)≈2:1, and Sn:Fe≈2:1. Thus, it can be determined that the ratio of atoms with Fe at the position A is about ⅓, so the chemical expression of the obtained novel MAX phase material is $V_2(Sn_{2/3}Fe_{1/3})C$.

Example 15: in this example, the ternary layered MAX phase material with magnetic elements at the position A is a $V_2(Sn_zFe_{1-z})C$ powder material, the precursor is $V_2AlC$, a Sn-containing material is Sn powder, and a Fe-containing material is Fe powder. The preparation method of the $V_2(Sn_zFe_{1-z})C$ bulk material is as follows:

(1) 2.4 g of NaCl, 3.1 g of KCl, 3 g of $V_2AlC$ powder, 1.3 g of Sn powder having 300 meshes and 0.15 g of Fe powder having 300 meshes were weighed, and the above materials were ground and mixed to obtain a mixture.

(2) The above mixture was placed in a corundum crucible to react in a high-temperature tubular furnace. Reaction conditions were as follows: 700° C., preservation for 720 min, and inert atmosphere protection. After the temperature of the tubular furnace was reduced to room temperature, a reaction product in the crucible was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 80° C. oven and then taken after 12 h, so as to obtain a solid product.

Figure 31A:
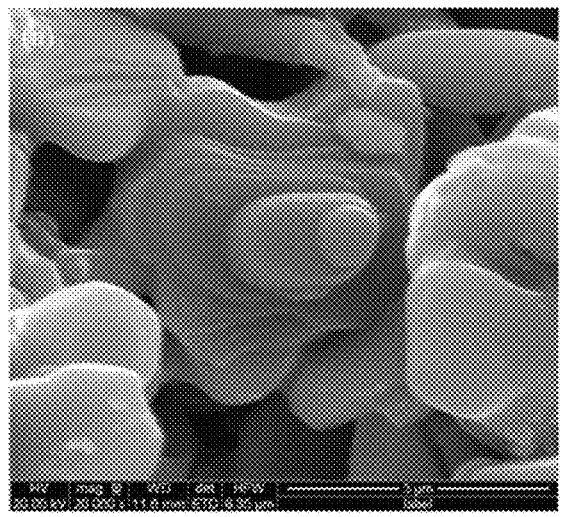
FIG. 31a and FIG. 31b are respectively an SEM image and an EDS analysis diagram of ternary layered MAX phase material V$_2$(Sn$_z$Fe$_{1-z}$)C with a magnetic element at the position A in example 15 of the present application.
Figure 31B:
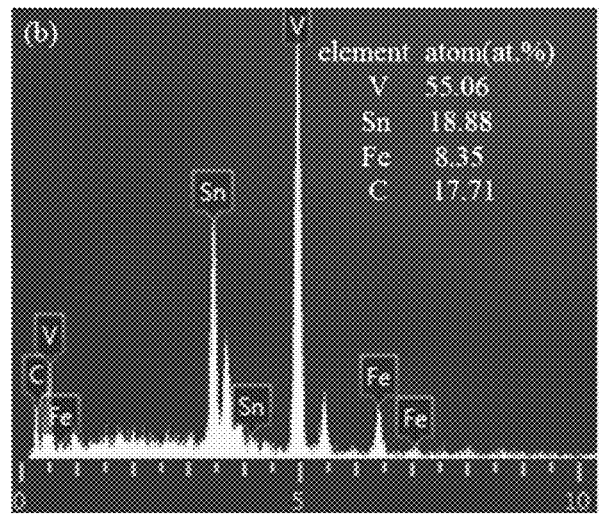

FIG. 31a and FIG. 31b are respectively the SEM image and the EDS diagram of the $V_2(Sn_zFe_{1-z})C$ material obtained by a molten-salt method under the condition of 700° C. It can be seen from the figure that the obtained $V_2(Sn_zFe_{1-z})C$ presents the typical layered structure of the MAX phase material, indicating that the obtained new material is the layered MAX phase material. EDS energy spectrum shows V: (Sn+Fe)≈2:1, and Sn: (Fe+Sn)≈0.70. Thus, it can be determined that the ratio of atoms with Fe at the position A is about 30%, so the chemical expression of the obtained novel MAX phase material is $V_2(Sn_{0.7}Fe_{0.3})C$.

Example 16: in this example, the ternary layered MAX phase material with magnetic elements at the position A is a $V_2(Sn_zCo_{1-z})C$ powder material, the precursor is $V_2AlC$, a Sn-containing material is Sn powder, and a Co-containing material is Co powder. The preparation method of the $V_2(Sn_zCo_{1-z})C$ block material is as follows:

(1) Sn powder having 300 meshes, Co powder having 300 meshes, $V_2AlC$ powder and NaCl were weighed, and the above materials were ground and mixed in a molar ratio of 2:1:6:3 to obtain a mixture.

(2) The above mixture was placed in a corundum crucible to react in a high-temperature tubular furnace. Reaction conditions were as follows: 1200° C., preservation for 100 min, and inert atmosphere protection. After the temperature of the tubular furnace was reduced to room temperature, a reaction product was taken.

(3) The reaction product was washed with deionized water and ethanol: the reactant was placed in a flask, deionzied water was added, the above materials were stirred and ultrasonically washed for 30 min and then subjected to standing for 1 h, and supernatant was discarded. After being washed three times, the reaction product was washed with ethanol and then s put into a 60° C. oven and then taken after 15 h, so as to obtain a solid product.

Example 17: in this example, the ternary layered MAX phase material with magnetic elements at the position A is a $V_2(Sn_zNi_{1-z})C$ powder material, the precursor is $V_2AlC$, a Sn-containing material is Sn powder, and a Ni-containing material is Ni powder. The preparation method of the $V_2(Sn_zNi_{1-z})C$ powder material is as follows:

(1) Sn powder having 300 meshes, Ni powder having 300 meshes, $V_2AlC$ powder and NaCl were weighed, and the above materials were ground and mixed in a molar ratio of 3:1:6:3 to obtain a mixture.

(2) The above mixture was placed in a corundum crucible to react in a high-temperature tubular furnace. Reaction conditions were as follows: 1000° C., preservation for 200 min, and inert atmosphere protection. After the temperature of the tubular furnace was reduced to room temperature, a reactant was taken.

(3) The reaction product was washed with deionized water and ethanol: the reactant was placed in a flask, deionzied water was added, the above materials were stirred and ultrasonically washed for 30 min and then subjected to standing for 1 h, and supernatant was discarded. After being washed three times, the reaction product was washed with ethanol and then put into a 80° C. oven, and then taken after 15 h, so as to obtain a solid product.

Example 18: in this example, the ternary layered MAX phase material with magnetic elements at the position A is a $V_2(Sn_zMn_{1-z})C$ powder material, the precursor is $V_2AlC$, a Sn-containing material is Sn powder, and a Ni-containing material is Ni powder. The preparation method of the $V_2(Sn_zMn_{1-z})C$ powder material is as follows:

(1) Sn powder having 300 meshes, Mn powder having 300 meshes, $V_2AlC$ powder, NaCl and KCl were weighed, and the above materials were ground and mixed in a molar ratio of 4:1:10:3:3 to obtain a mixture.

(2) The above mixture was placed in a corundum crucible to react in a high-temperature tubular furnace. Reaction conditions were as follows: 800° C., preservation for 600 min, and inert atmosphere protection. After the temperature of the tubular furnace was reduced to room temperature, a reaction product was taken.

(3) The reaction product was washed with deionized water and ethanol: the reaction product was placed in a flask, deionzied water was added, the above materials were stirred and ultrasonically washed for 30 min and then subjected to standing for 1 h, and supernatant was discarded. After being washed three times, the reaction product was washed with ethanol and then put into a 50° C. oven, and then taken after 15 h, so as to obtain a solid product.

The properties of the ternary layered MAX phase material with magnetic elements at the position A obtained in examples 16-18 of the present application are basically consistent with those of the product in examples 12-15.

In addition, the inventor of the present application conducts relevant experiments by replacing corresponding raw materials and process conditions in the foregoing examples 12-18 with other raw materials and process conditions described in the specification. All the results show that MAX phase materials with Zn, Cu, Mn, Fe, Co, Ni and other elements at the position A can be obtained.

In summary, compared with the existing MAX phase materials, the novel MAX phase material provided by the forgoing examples of the present application have the advantages of high intensity, high heat conductivity, high electric conductance, oxidization resistance, magnetism, high temperature tolerance, high damage tolerance, machinability and the like, and the preparation process is simple to operate, and has application prospect in the fields of aerospace thermal structural materials, nuclear energy structural materials, energy storage, catalysis, wave absorption, electromagnetic shielding, spin electron, magnetic refrigeration, magnetic storage and the like.

It should be understood that the above descriptions are only examples of the present application, but therefore limit the patent scope of the present application. Equivalent structures or equivalent flowchart transformations made by utilizing the contents of the Description and drawings of the present application are directly or indirectly applied to the other relevant technical fields, and are all included in the patent protection scope of the present application.

What is claimed is:

1. An MAX phase material, wherein a molecular formula of the MAX phase material is represented as $M_{n+1}(A_zA'_{1-z})_hX_n$, wherein A comprises Ni, Co or Mn element, M is selected from group IIIB, IVB, VB or VIB elements, A' is selected from group IIIA, IVA, VA or VIA elements, X is selected from C and/or N elements, n is 1, 2, 3 or 4, $0<z\leq1$, h is a number of $(A_zA'_{1-z})$ layers of atoms located between $M_{n+1}X_n$ unit layers, and h is 1, 2 or 3, and wherein M comprises any one or a combination of more than two of Sc, Cr, Zr, Nb, Mo, Hf and Ta.

2. The MAX phase material according to claim 1, wherein the MAX phase material has a hexagonal system structure and a space group of P63/mmc, and a unit cell is formed by alternately stacking $M_{n+1}X_n$ units and $(A_zA'_{1-z})_h$ layers of atoms.

3. The MAX phase material according to claim 1, wherein a unit cell of the MAX phase material is formed by alternately stacking $M_{n+1}X_n$ units and $(A_zA'_{1-z})_h$ layers of atoms.

4. The MAX phase material according to claim 1, wherein X is $C_xN_y$, wherein (x+y)=1.

5. The MAX phase material according to claim 1, wherein a morphology of the MAX phase material comprises powders, bulks or films.

6. A method of using the MAX phase material according to claim 1, wherein the MAX phase material is used to prepare aerospace thermal structure materials, nuclear energy structure materials, high-temperature electrode materials, frictional wear materials, energy storage materials, catalytic materials and electromagnetic shielding and absorption materials, and magnetic refrigeration or magnetic storage.

7. The method according to claim 6, wherein the MAX phase material has a hexagonal system structure and a space group of P63/mmc, and a unit cell is formed by alternately stacking $M_{n+1}X_n$ units and $(A_zA'_{1-z})_h$ layers of atoms.

8. The method according to claim 6, wherein a unit cell of the MAX phase material is formed by alternately stacking $M_{n+1}X_n$ units and $(A_zA'_{1-z})_h$ layers of atoms.

9. A preparation method for the MAX phase material according to claim 1, comprising a molten-salt method and/or a discharge plasma sintering method.

10. The preparation method according to claim 9, wherein a unit cell of the MAX phase material is formed by alternately stacking $M_{n+1}X_n$ units and $(A_zA'_{1-z})_h$ layers of atoms.

11. The preparation method according to claim 9, wherein the MAX phase material has a hexagonal system structure and a space group of P63/mmc, and a unit cell is formed by alternately stacking $M_{n+1}X_n$ units and $(A_zA'_{1-z})_h$ layers of atoms.

12. The preparation method according to claim 9, comprising: mixing a precursor MAX phase material, an A and/or A-containing material and an inorganic salt in a molar ratio of 1: (1.5-3):(3-6) to form a reactant mixture, carrying out a high-temperature reaction on the reactant mixture at 400° C.-1000° C. in an inert atmosphere, subsequently carrying out a posttreatment with the reactant mixture to obtain the MAX phase material, wherein the A is at position A; a molecular formula of the precursor MAX phase material is represented as $M_{m+1}A'X_m$, wherein M is selected from early transition metal elements in group IIIB, IVB, VB or VIB, A' is selected from group IIIA or IVA elements, X comprises C and/or N elements, m=1, 2 or 3, and A is Ni, Co, or Mn element.

13. The preparation method according to claim 12, wherein the A-containing material comprises any one or a combination of more than two of A-containing alloy, A-containing oxides and A-containing salts; the A and/or A-containing material is a powder having a particle size of 500 nm-50 μm.

14. The preparation method according to claim 12, wherein the posttreatment comprises: after the high-temperature reaction is ended, washing the reactant mixture with deionized water, and then drying at 40° C.-80° C. to obtain the MAX phase material.

15. The preparation method according to claim 12, wherein the precursor MAX phase material is any one or a combination of more than two of powders, bulks and films; and/or, the precursor MAX phase material comprises any one or a combination of more than two of $Cr_2GaN$, $Cr_2AlC$, $Sc_2AlC$, $Zr_2AlC$, $Zr_2SnC$, $Nb_2AlC$, $Nb_4AlC3$, $MozAlC$, $Mo_2GaN$, $Hf_2AlC$, $Hf_2AlN$, $Ta_3AlC2$ and $Ta_4AlC3$.

16. The method according to claim 6, wherein X is CxNy, wherein (x+y)=1.

17. The method according to claim 6, wherein a morphology of the MAX phase material comprises powders, bulks or films.

* * * * *